US006885641B1

(12) United States Patent
Chan et al.

(10) Patent No.: US 6,885,641 B1
(45) Date of Patent: Apr. 26, 2005

(54) SYSTEM AND METHOD FOR MONITORING PERFORMANCE, ANALYZING CAPACITY AND UTILIZATION, AND PLANNING CAPACITY FOR NETWORKS AND INTELLIGENT, NETWORK CONNECTED PROCESSES

(75) Inventors: Ken Chan, Vancouver (CA); Fredrick K. P. Klassen, Coquitlam (CA); Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,403

(22) Filed: Dec. 1, 1999

Related U.S. Application Data

(63) Continuation-in-part of application No. 09/267,843, filed on Mar. 12, 1999, now Pat. No. 6,711,137.

(51) Int. Cl.[7] .............................................. H04L 12/24
(52) U.S. Cl. ...................................................... 370/252
(58) Field of Search ................................. 370/252, 230, 370/230.1, 231, 232, 233, 234, 235, 250, 253, 248, 249; 709/223, 224, 225, 207, 237, 238, 240

(56) References Cited

U.S. PATENT DOCUMENTS

| | | | |
|---|---|---|---|
| 5,315,580 A | 5/1994 | Phall ........................... 370/13 |
| 5,381,404 A | 1/1995 | Sugano et al. ................ 370/13 |
| 5,450,394 A | 9/1995 | Gruber et al. ................. 370/17 |
| 5,477,531 A | 12/1995 | McKee et al. ................. 370/17 |
| 5,563,875 A | 10/1996 | Hefel et al. ................... 370/15 |
| 5,570,346 A | 10/1996 | Shur ........................... 370/17 |
| 5,596,719 A | 1/1997 | Ramakrishnan et al. ..................... 395/200.02 |
| 5,627,766 A | 5/1997 | Beaven .................. 364/551.01 |
| 5,633,861 A | 5/1997 | Hanson et al. .............. 370/232 |
| 5,668,800 A | 9/1997 | Stevenson .................... 370/248 |
| 5,734,825 A | 3/1998 | Lauck .................... 395/200.13 |
| 5,768,520 A | 6/1998 | Dan et al. .............. 395/200.53 |
| 5,781,534 A | 7/1998 | Perlman et al. ............. 370/248 |
| 5,793,976 A | 8/1998 | Chen et al. ............ 395/200.54 |
| 5,819,028 A | * 10/1998 | Manghirmalani et al. ........................ 395/185.1 |
| 5,838,919 A | * 11/1998 | Schwaller et al. ..... 395/200.54 |
| 5,886,643 A | * 3/1999 | Diebboll et al. ........ 340/825.08 |
| 5,974,457 A | * 10/1999 | Waclawsky et al. ........ 709/224 |
| 6,061,722 A | * 5/2000 | Lipa et al. .................. 709/224 |
| 6,137,777 A | * 10/2000 | Vaid et al. .................. 370/230 |
| 6,216,163 B1 | * 4/2001 | Bharali et al. .............. 709/227 |
| 6,473,404 B1 | * 10/2002 | Kaplan et al. .............. 370/238 |
| 6,502,131 B1 | * 12/2002 | Vaid et al. .................. 709/224 |

\* cited by examiner

*Primary Examiner*—Chau Nguyen
*Assistant Examiner*—Duc Duong
(74) *Attorney, Agent, or Firm*—Shelley M Beckstrand

(57) ABSTRACT

Analysis of networks and testing and analyzing intelligent, network connected devices. An instantaneous network utilization value is assigned for the worst surviving ping instance of between 90% and 99% (determined proportionately from the ratio of dropped test samples to surviving test samples), and then used to solve for average network message size and average utilization of the network. A plurality transactions of different types are transmitted across the network to intelligent end systems and the results mathematically evaluated to determine the portion of the total response time contributed by the network and by the end processors; the utilization of the end processor processing subsystems and of the end processor I/O subsystems; and the utilization of the end system as a whole; and of the network and end processors considered as a unitary entity. Steps include determining utilization of the network when test packets are dropped by the network; utilization of intelligent processor and other devices attached to the network when test transactions are dropped, and when not dropped; and response time for remote processes at both the network and processor level.

27 Claims, 6 Drawing Sheets

SYSTEM AND METHOD FOR MONITORING PERFORMANCE, ANALYZING CAPACITY AND UTILIZATION, AND PLANNING CAPACITY FOR NETWORKS AND INTELLIGENT, NETWORK CONNECTED PROCESSES

CROSS REFERENCES TO RELATED APPLICATIONS

This application claims priority under 35 U.S.C. § 120 as a continuation-in-part application of related U.S. patent application Ser. No. 09/267,843, filed 12 Mar. 1999, now U.S. Pat. No. 6,711,137, by F. K. P. Klassen and R. M. Silverman, entitled "SYSTEM AND METHOD FOR ANALYZING AND TUNING A COMMUNICATIONS NETWORK" (hereafter referred to as Klassen & Silverman.).

BACKGROUND OF THE INVENTION

1. Technical Field of the Invention

This invention pertains communication systems. More particularly, it relates to testing for, determining, and analyzing the capacity, current utilization, and current performance of the infrastructure supporting intelligent processes connected by a communications network, as well as to capacity planning for such systems.

2. Background Art

Users and managers of infrastructures including intelligent processes connected by communications networks need to know the capacity, performance, current utilization, response time, throughput, reliability, availability, topology, and service level attainment of the infrastructure in order to maintain, troubleshoot, and capacity plan for both the network and the intelligent endpoints attached to the network. Today this need is exemplified by the desire of organizations to provide customers with a high level of service on their web sites as they move business functions onto the Internet. With the coming of the pervasive computing environment in which inexpensive powerful microprocessors are embedded in vast numbers of appliances, personal assistants, and other machines and devices connected across intranets and internets, the importance and the complexity of understanding, managing, and planning the performance of interconnected intelligent systems will grow.

Currently, many separate, incompatible, complicated, and often unsatisfactory tools are required to perform the tasks required for managing interconnected intelligent systems. Existing management and planning tools and methodologies for such systems suffer from at least one of the following current shortcomings:

1. require user knowledge and input of current (and/or proposed) network topology;
2. require user to take a trace or multiple traces (snapshot of the network and computing system over a given time period) as a basis of analysis;
3. require network or end devices to perform calculations and store their results for subsequent retrieval or periodic reporting of this information;
4. require clock synchronization for centralized coordination and analysis of the trace and/or stored data;
5. analyze network and intelligent processor system components on an individual basis, and not as a whole;
6. require user knowledge and input of the configuration, customization, and capacity of the various computer and network components (e.g., processors, adapters, buses, internal and external storage, input/output microprocessors, channels, and local and wide area links), which may be based upon manufacturers' or suppliers' claims that are erroneous or not applicable to the users' environment; and, moreover, in internet, business-to-business, and pervasive computing connections, a subset of the components of such connections may be owned or controlled by more than one organization, so that access to performance, configuration, and other management information typically used for performance evaluation, planning, and troubleshooting may be inaccessible for entire subsets of the system considered as a whole;
7. require user knowledge and input of current system and network customization (e.g., tuning parameters);
8. provide either analysis of the current performance and status of the network, or an estimation of the network assuming user-input changed load or configuration, or a database of the network's past condition; but not all functions together as a seamless, consistent whole; and
9. send sample transactions or test packets to establish an average time value for system performance without performing mathematical analysis of the test transaction and test packet results to derive capacity and performance characteristics of the underlying network and processors.

With regard to network performance, users and managers of networks frequently use TCP/IP pings (i.e., architected network echo packets) to check the availability of a target resource and the network connecting to it. In addition, ping programs commonly report the ping's round trip time, and user network managers can get a feel for the "usual" amount of time a ping should take between stations A and B on their network. Typically, the ping function provides one way and two way transfers. In one way pings, a transmitter sends a packet to an echo server device which discards the packet and returns a time stamp to the server. In two way pings, the echo server returns the packet with the time stamp.

Current network and processor evaluation systems which send test packets across a network require that the evaluator have knowledge of the processor configuration and of the capacity of the individual processor components, have knowledge of the network topology, require that special proprietary code be installed in the processors and in intermediate network devices, and do not use queuing theory or provide an analytic evaluation of the test results.

Also, current performance estimation systems which employ queuing-theory-based evaluations of network and processor systems require that the evaluator have knowledge of the network topology, require storage and retrieval of data from intermediate network devices, require capture and analysis of network and processor traces that are depictions of the network and processors at a given time, require knowledge of the detailed configuration and customization of all processor and network devices, require knowledge of the capacity of each intermediate device and device interface, and require intensive preparation to set up and use.

A network, or networked, system refers to an interconnected system considered both as a whole as well as to its network and processor components each considered individually.

It is an object of the invention to provide a system and method for monitoring performance, capacity, and utilization of a network system.

It is a further object of the invention to provide a system and method for predicting the future performance of a network system based on changes in utilization or capacity.

It is a further object of the invention to provide a system and method for recording the past performance, capacity and utilization of a network system;

It is a further object of the invention to provide a system and method for enabling rapid, easy to use analysis of network connected processes providing those responsible for the management of the networked system supporting such processes to determine whether or not there is a problem in the networked system, and if there is a problem, whether it is in the end processors or the network, and whether the problem is with the capacity of or the tuning of an identified component.

It is a further object of the invention to provide a system and method for dealing with apparent responsiveness, a key concept for understanding the networked system's "response time" characteristics, providing an improved system and method for using transactions such as point and click together with pings of different sizes (as described in Klassen & Silverman) to mathematically deduce aspects of network performance, processor performance, and the network and processor performance considered as a unitary whole as its apparent responsiveness.

It is a further object of the invention to provide a system and method for performing mathematical analysis of test ping and transaction results to determine a network end-to-end throughput and response time bandwidth; the end processor transaction capacity; for determining a network end-to-end queue delay; for determining network end-to-end latency delay; for determining network internal packet size; and for determining the utilization of a network and utilization of intelligent processors connected by the network.

It is a further object of the invention to provide a system and method for improving end-to-end bandwidth analysis; expanding the concept of a queue delay to one of a queue depth; and providing a system and method for improving analysis of processor utilization for the processor as a whole as well as for I/O bound and processor bound operations.

It is a further object of the invention to provide a system and method for providing a comprehensive end-to-end queuing theory analysis of a network and processor.

It is a further object of the invention to provide a system and method for evaluating key network performance parameters of concern to the managers, support personnel, and planners responsible for data communication and data, voice, and video communications networks including the intelligent processors in supporting devices for such communications networks such as cellular phones and pagers.

It is a further object of the invention to provide a system and method for testing for the presence of prioritization support within a networked system and, if present, measuring the capacity, utilization, and performance of the networked system from the perspective of the various priority levels by means of transmission and analysis of sample packets and transactions set at varying priorities.

It is a further object of the invention to provide a flexible, portable, easy to use network analysis method and system which works non-disruptively on a live networked system, provides instantaneous analysis of the current condition of the networked system, to provide the capability to establish an historical database, and provides what if analysis for future changes to the networked system.

SUMMARY OF THE INVENTION

The method of the preferred embodiment of the invention for determining network utilization includes the steps of (1) sending probative test packets and transactions across a live data communications or data and voice communications network to an intelligent end station, and (2) applying queuing theory to the test results to determine the capacity, utilization, and performance of the network, the devices connected by the network, and the devices and network considered as a unitary system.

In accordance with a further aspect of the invention, a system and method is provided for evaluating a networked system comprising a communications network, intelligent end devices (within or at the boundary of the network), or the network and end devices considered as a unitary entity. A plurality of network evaluation signals, or probative test packets, are selectively sent and received through the network and a plurality of probative transactions and data streams are selectively sent to intelligent end stations. Responsive to these evaluation signals, selective network evaluation and intelligent end station parameters are determined and stored. Queuing theory analysis, responsive to these parameters, determines the response time and throughput characteristics, including capacity, utilization and performance of the networked system.

In accordance with another aspect of the invention, there is provided a computer program product configured to be operable for evaluating a networked system. A plurality of network evaluation signals are selectively sent and received through the network and a plurality of probative transactions and data streams are selectively sent to intelligent end stations. Responsive to these evaluation signals, network evaluation and intelligent end station parameters are determined and stored. Queuing theory analysis, responsive to these parameters, determines the response time and throughput characteristics, including capacity, utilization and performance of the networked system.

Other features and advantages of this invention will become apparent from the following detailed description of the presently preferred embodiment of the invention, taken in conjunction with the accompanying drawings.

BEST MODE FOR CARRYING OUT THE INVENTION

U.S. patent application Ser. No. 09/267,843 filed 12 Mar. 1999 by F. K. P. Klassen and R. M. Silverman (hereafter, Klassen & Silverman) describes a technique of communication network analysis in which sequences of different numbers of different length echo and one way packets are transmitted across the network and their transmission and receipt times are mathematically analyzed to determine the capacity and performance of the network including:

the network path response time bandwidth (network hop-count sensitive bits per second capacity);

the network throughput bandwidth (network streaming capacity for which hop count is irrelevant);

whether the network is a single server or multi-server queuing system;

the network average message size;

the network utilization;

the network latency (including propagation delay and device latency);

current network-level response time for a message of a given length;

current network-level throughput capability across a connection; and extensive what-if performance estimations for the network under changed usage or configuration conditions.

In accordance with the present invention, certain improvements and functional extensions to Klassen & Silverman are provided. The improvements include an improved method for determining network utilization. The functional extensions provide application of the methodology, including new utilization calculation routines and mathematical formulas, to computer and other intelligent processor devices considered independent of the network, as well as to the entire system consisting of the intelligent processors and the network connecting them.

Figure 1:
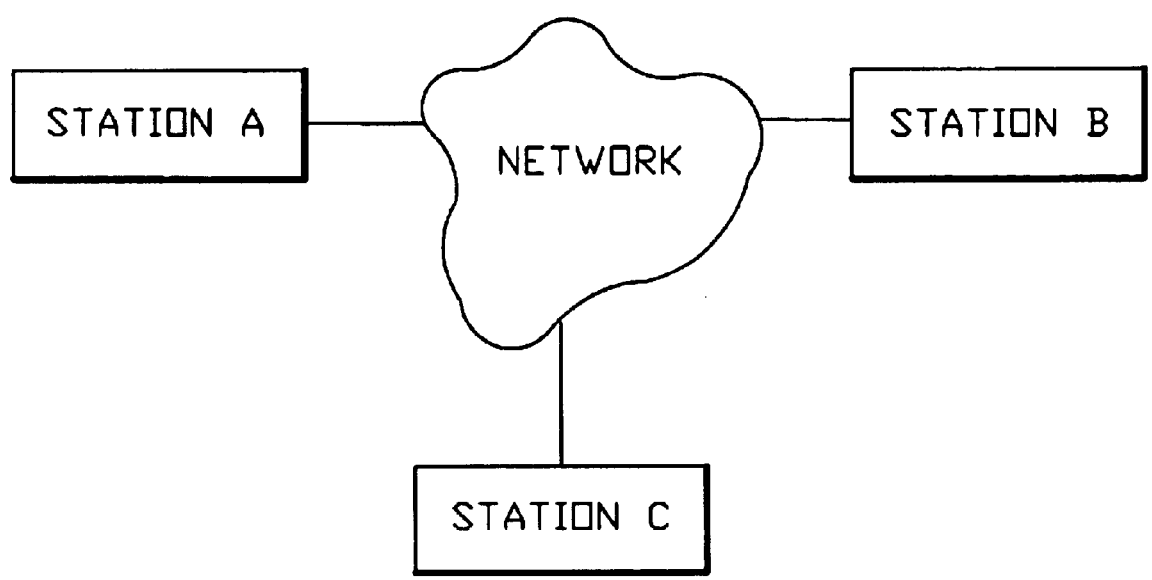
FIG. 1 illustrates a networked system and networked system evaluation system in accordance with the preferred embodiment of the system of invention.

Referring to FIG. 1, a communications network cloud is depicted with a client station A, a server station B (or they can be peer stations) and a network management station C connected to the cloud at its boundary. The program code embodying a preferred embodiment of the invention can reside in any one or in any combination in each of the three stations. As used herein, a networked system refers to a network cloud, together with its intelligent end stations A, B, and/or C considered as a unitary whole.

This invention provides a system and method for testing for, determining, and analyzing the capacity, current utilization, and current performance of the infrastructure supporting intelligent processes connected by a communications network, as well as providing a methodology for capacity planning for such systems. More particularly, the invention relates to providing a full analysis of the components of networked intelligent systems when considered as a single system and also considered independent of each other as standalone systems. The system and method of the invention includes, therefore, the intelligent end points, such as computers or other devices with embedded processing capability, as well as the network connecting these intelligent endpoints, whether an intranet (an internal network of an organization) or an internet (e.g., the world wide web), as well as the entire network/intelligent processor system when considered as a unitary whole.

In accordance with the invention, the system and method provided by Klassen & Silverman is extended to the processors at the end points of the network, and to extend that system to the network together with the end processors when the network and processors are considered as a unitary entity. The invention further provides a system and method for near-instantaneous evaluations of processors and the network connecting them that analyzes the current state of the network and processors and allows for "what if" scenarios involving all performance components for capacity planning, including: determining end-to-end network utilization; determining processor utilization; determining average message size in the network (this is not to be confused with "network internal packet size", which is a measure of the minimum network device buffer size, not network user message sizes); determining end-to-end network device latencies; determining end-to-end network propagation delay (a function of distance and speed of light); determining network response times for messages of any specified length under a null network load ("estimated optimal network service level"); determining network response times for messages of any specified length under the current network load ("estimated current service level"); estimating network utilization level at which a user-input service level compliance is compromised; determining network duplex, hop count, multi server and "throughput" factors (four new end-to-end measurement concepts for network analysis and capacity planning); determining optimal maximum network window size, based on user message size, assuming no competing traffic; estimating expected current window size for a given message size at current network utilization; estimating change in response time and optimal window size if servers and/or users are relocated (e.g., datacenter consolidation or move); estimating change in response time and optimal window size if apparent network bandwidth is changed; and estimating unidirectional and bi-directional file transfer throughput capacities and window sizes under null, current, or other network load conditions.

In accordance with the invention, a system and method is provided for performing rigorous, real-time, queuing theory-based network analysis without need for knowledge of the components, topology or usage characteristics of the network. In accordance with a preferred embodiment of the invention, a network is treated as an apparent system or black box singular entity rather than as a set of multiple connected hops along a path. Similarly, an end processor is treated as a black box singular entity, rather than as a set of microprocessor, bus, and storage subsystems. Similarly, the preferred embodiments treat the entire system of end processors and the network connecting them as a black box singular entity, providing a testing methodology and mathematical analysis for the entire system. For each such black box, the invention provides a testing method and associated technique for applying queuing theory and other mathematical analysis enabling the system to characterize the responsiveness (for individual transactions), throughput (for streaming applications), and apparent utilization of the system in terms of response time expressed in units of time per transaction, throughput expressed in units of data shipped per unit of time, and utilization expressed as the complement of percent of capacity available in the system (i.e., the network or the end processors or the network and end processors viewed as a single system).

The system and method of the preferred embodiment of the invention combines a new probing test transmission and analysis method for data processing and other intelligent end user devices with Klassen & Silverman's network probing test frame transmission method and analysis method. Combining these methods allows measurement of the intelligent devices that are connected by the network, the network itself, or the combined system consisting of the end devices and the network as a singular entity and creates a queuing theory model for the end devices, the network, or their combination as a singular entity. The invention also includes new methods for determining the utilization of the network, the utilization of the intelligent processors, and the utilization of the network and processors considered together as a single system.

In order to establish the historical, current, and predicted future of states for the networked system for all types of network traffic and transactions, including interactive, browser, batch, and realtime traffic; probative transmissions, including echoed and non-echoed packets and transactions, of like and differing lengths, of like and differing network priority, individually and in streams, are sent and transit times measured, and queuing theory applied to the results.

Probative testing techniques previously known in the art make no use of queuing theory, and queuing theory techniques previously known in the art make no use of probative testing. In accordance with the present invention, probative testing and queuing theory are combined in a new methodology for capacity and performance analysis of networks, intelligent devices connected to networks, and networks and intelligent devices considered as a unitary whole. In accordance with this new methodology, new concepts and means for testing to discover their values are provided. For the network, the subjects for probative testing are the four principle types of network traffic covered in Klassen & Silverman, including: (1) voice/video, (2) client/server transaction, (3) web browser, and (4) batch file, print, and fax. For processors and other end user devices, they include: (1) processor-bound transactions, (2) I/O-bound transactions, and (3) general transactions.

A processor-bound transaction is a transaction that is reliant upon the computer processor for completion much more than the computer retrieval of data from storage. An I/O bound transaction is one in which the computer processor use is minimal in comparison with the work required to perform the number of retrievals of data from storage necessary to complete the transaction. A general transaction stresses both the processor and data retrieval facilities of a computing system. An example of a general transaction would be logging into a computer application where the user enters a user I.D. and a password. The computer must process the input, retrieve the user account profile, verify the password, check for expiration, and respond to the user. The analytic portion of this transaction is processor-bound, the data retrieval portion is I/O bound, and because the transaction involves both, it is called a general transaction.

Application response time across a network has two major components; computer system response time and network response time. In accordance with the method of the invention, transactions are performed across a network together with probative tests of the network in order to determine the state of the network (i.e., its capacity and utilization) and thus derive the network contribution to application response time, and the state (i.e., capacity and utilization) of the end computer system and its contribution to response time.

As is covered in Klassen & Silverman, network response time has four components: (1) serialization time (for a message length), (2) device latency, (3) propagation delay, and (4) queue delay. In accordance with the method of that invention, apparent bandwidth is used as the basis for deriving serialization time. Apparent bandwidth is derived by subtracting short ping time from long ping time (discrete pings). Pings also determine the network's latency. Network quality factor is used in a propagation delay formula for distinguishing between device latency and propagation delay latency. The network's queue is measured as a number of messages on a queue and their size, thus determining the network's average message length. Measuring the number of messages on the queue and their length is the key for application of queuing theory.

This invention provides a new, improved method for calculation of network utilization, a method for testing capacity and utilization of processing devices, and a method combining network probative testing and analysis with processor probative testing and analysis to determine the capacity, utilization, and response time of the network, the intelligent processors attached to the network, and the system including the network and intelligent processors considered as a unitary entity.

Within a network, determining percent utilization requires discovering the average number of bits in the network queues and discovering the network average message size. Heretofore, utilization has been calculated by means of stored information at various points along the network for hop-by-hop analysis or else by estimating a message arrival rate, the server (i.e., network) speed, and the number of servers. In accordance with the parent application by Klassen & Silverman, probative testing is used to determine the state of the live network as an end-to-end entity rather than relying on user estimates or data stored in the network. In order to measure network utilization and apparent bandwidth and latency in support of queue analysis for the network, the number of messages on queue is derived from utilization. Heretofore, queuing theory-based methodologies derived utilization from the arrival rate of messages.

In accordance with the present invention, the formula $u/(1-u)$, where u is utilization expressed in decimal, is used for number of messages on queue and in service. Thus, the system and method of the present invention views the network as a singular end-to-end entity. The number of servers ("n") must also be determined in order to derive the multi server value from the formula $u^n/(1-u^n)$. Prior means of calculating multi server queue behavior involved use of Poisson distributions and Erlang functions. One text on queuing states:

"As can be seen, this [Poisson, Erlang] quantity is a function of the number of servers and their utilization. Unfortunately, this expression turns up frequently in queuing calculations and is not easy to compute. Tables of values are readily found, or a computer program must be used." (Stallings, High Speed Networks: TCP/IP and ATM Design Principles, Prentice Hall, 1998, pp 162–3.)

In accordance with the present invention, the formula $u^n/(1-u^n)$ is provided as a new measure for queue buildup based on utilization for multi server systems. It represents an accurate generalization of tables of the sort referred to by Stallings, greatly simplifies prior methods for multi server queue analysis, and together with the new techniques described below for probative network testing to derive a value for the networks multi server factor, provides calculations appropriate for the testing and measurement of all kinds of network traffic in all topologies and for deriving queuing theory based evaluations of past, current, and future (i.e., "what-if" analysis of) network behavior.

In addition to response time, the network's throughput characteristics are determined by streaming of pings (one way, with "discard"). This is used to determine the network's throughput bandwidth. The network's throughput bandwidth number is then divided by the apparent bandwidth number to get the network's "hop count factor," which in accordance with the present invention is used for relating the response time bandwidth of the network to the network's throughput bandwidth.

Two way streaming tests for and measures two-way throughput bandwidth of a network. Then, dividing the two-way throughput by the one way throughput provides the network duplex factor. Additional testing provides for multi streamed testing, across multiple adapters, to determine whether there are multiple paths available between the source and target across the network. In this manner multi stream throughput, is derived. The multi stream throughput divided by throughput bandwidth (or duplex throughput as applicable) equals the multi server factor. This multi server factor is then used to calculate a revised value for the equation for number of messages on queue. So where "n" is the multi server factor, in accordance with the present invention the number of messages on queue (and in service) is derived from $u^n/(1-u^n)$. It is by means of discrete echo testing, throughput testing, the concepts and measurement of hop count, throughput factor, duplex factor, and multi-server factor, and the application of queuing theory that the full measure of a network's capacity and performance for all types of network traffic is provided by the present invention.

In particular, the network multi server factor and the network hop count provide a means for the singular black box to reflect the characteristics of a network of queues, some of which have multiple servers. Prior queuing theory models required user input of the capacity, message sizes, message rates, and numbers of servers for each hop along the path and each end system. Efforts to create a singular queuing model were not accepted because of the difficulty of computing a singular value for the capacity of the multiple hops and servers, the difficulty of assigning a singular utilization number to the aggregation of hops and servers, and the difficulty of accounting for the fact that different portions of the system have different, there is provided a fast, easy probative testing method that determines capacity of the system for performance of the different tasks for which it is responsible without reliance on manufacturer claims or documentation that may be faulty, determines the utilization of the system, determines the ability of the system to treat traffic and transactions according to a requested prioritization level, determines a value for the number of internal path hops for the end-to-end connection, and determines a multi server value. Together these features of the invention allow a singular queuing model to reflect a complex end-to-end system without detailed documentation, tracing, or other information review and acquisition that is difficult to perform in systems all the parts of which belong to one organization, and is not, for practical purposes, possible when different organizations and individuals connect across the internet.

The system and method of the preferred embodiment of the invention derives average message length for all priorities, derives queuing theory input for all priorities, determines arrival rates and utilization, stores the results in database, derives expected current window size, optimal window size, expected current average (or by percentile) network response time for user-input message lengths, derives utilization at which response time requirement is not met, and performs what-if analysis of such cases as change of location of servers or users, in utilizations (by priority), in utilization by user traffic pattern, in device latencies and in bandwidth. These network results are then combined with probative transaction tests, to determine the performance characteristics and utilization of intelligent systems attached to the network. In this manner the utilization, capacity, and queuing characteristics of the network, the intelligent end systems, and the network and end systems together can be determined.

Further in accordance with the preferred embodiment of the invention, a system and method is provided for evaluating the four key categories of network performance of concern to the managers, support personnel, and planners responsible for data communications and data, voice and video communications networks. Those categories are: (1) performance of the network in support of single turnaround, response time dependent traffic, such as interactive Telnet and IBM 3270 traffic; (2) performance of the network in support of multiple turnaround, response time dependent traffic, such as Intranet and Internet browser traffic; (3) ability of the network to support throughput dependent traffic, such as file, print and fax traffic; and (4) ability of the network to support realtime traffic, such as voice and video traffic. In addition, the intelligent end systems are tested for their ability to perform transactions (or other work) having different performance characteristics such as stressing the end system processors, input/output subsystems, or both.

Further in accordance with the preferred embodiment of the invention, the entire network under evaluation is treated as a unitary entity, or black box, that connects a client to a server, and a connection across this network entity is analyzed by sending probative test packets into the network and using queuing theory to assess all factors relevant to the network current and future abilities with respect to each of the above described four network performance categories.

In accordance with the invention, network testing is performed by transmitting packets among devices in or attached to a network, including tests (a) through (j), as follows:

(a) sending echo or discard packets (e.g., pings) of uniform length, isolated from one another by fixed intervals;
(b) sending echo or discard packets of uniform length in a stream;
(c) sending echo or discard packets of different lengths, isolated from one another by fixed intervals;
(d) sending a file (or equivalent batch transfer) unidirectionally across the network, repeating with different packet sizes;
(e) sending a file bidirectionally across the network, repeating with different packet sizes;
(f) sending multiple files unidirectionally across the network; and/or
(g) sending multiple files bidirectionally across the network;
(h) sending processor-bound transactions across the network to end systems;
(i) sending I/O-bound transactions across the network to end systems; and
(j) sending general transactions across the network to end systems.

In accordance with a further embodiment of the invention, response time and throughput in prioritized networks may be calculated by first detecting whether prioritization has effect in the network, determining the utilization of the network at different priority levels, and then deriving predictive results for current and future response time and window sizes for different types of service.

In accordance with a further embodiment of the invention, capacity and utilization of intelligent end systems attached to the network are determined, so that performance of the network and the end processors can be determined, thereby allowing queuing theory based predictions of future behavior, storing data concerning past behavior, and monitoring the current behavior of the network and the end systems. This allows those responsible for providing a specific level of service to understand whether the service level is being, was being, or will be attained. Furthermore, if the service level is not being attained, the inventions system and method provides the means to determine whether the problem is in the network or in the end systems, something which is otherwise very difficult to do.

Figure 2:
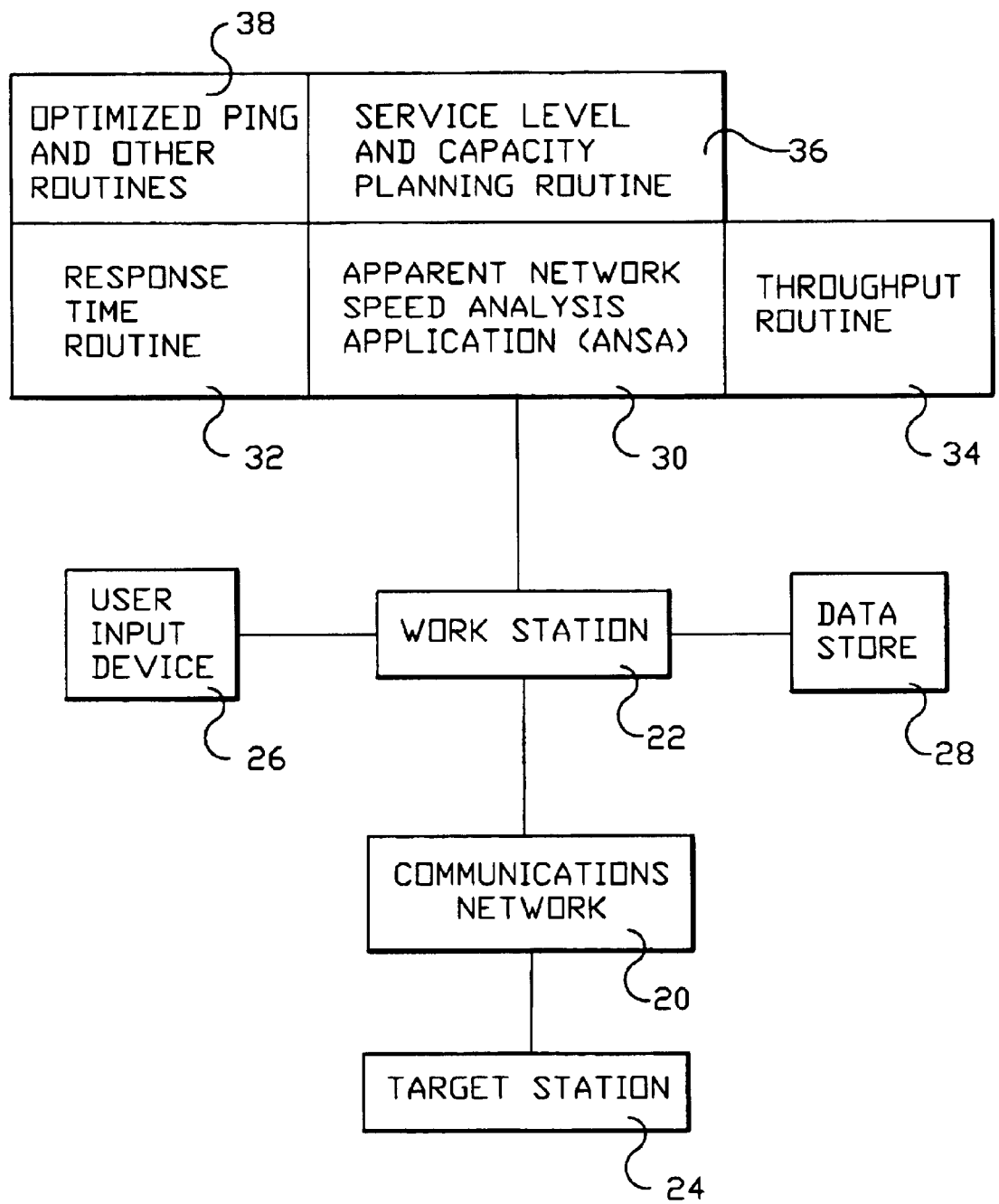
FIG. 2 illustrates a communications network and network evaluation system in accordance with a preferred embodiment of the system of the invention.

Referring to FIG. 2, in accordance with the preferred embodiment of the invention, apparent network speed analysis (ANSA) application 30 executes on workstation 22 to measure, monitor, estimate, capacity plan, and tune communications network 20 (such as the network cloud of FIG. 1) with respect to target station 24. A user input device 26 and data store 28 are provided at work station 22, and ANSA 30 includes a response time routine 32, a throughput routine 34, a service level and capacity planning routine 36, and optimized ping and other routines 38 such as transaction transmission routines for processor-bound, I/O-bound, and general end system transactions.

Network response time analysis routine 32 provides for determination of the apparent bandwidth, utilization, internal message size, queue factor, and device latency of communications network 20.

Throughput analysis routine 34 provides for defining, calculating, and using the following new network concepts: Hop Count Factor, Duplex Factor, Throughput Factor, and Multi-Server Factor.

Service level and capacity planning routine 36, responsive to the skilled use of routines 32 and 34, provides comprehensive "what-if" network planning facilities; calculation of the increase (or change) in network traffic before network response time service level is compromised; calculation of the additional file load capacity of the network, which is the additional file load before response time is compromised (for both prioritized and non-prioritized network cases); and determination of tuning recommendations for recommended window size for file transfer to fill remaining capacity (both respective and irrespective of maintaining response time service level, and for both prioritized and non-prioritized cases). In addition, routine 36 performs comprehensive what if end processor planning for the end systems with respect to processor-bound, I/O-bound, and general transactions.

Optimized ping and other methodologies routines 38 provides for optimized pinging, and extensions for ping, transaction, file echoing, bursts, multi streaming, and uni-directional transmission and recording.

Transaction transmission and analysis routines of other routines 38 provide for analysis and recording of transaction completion times.

Further in accordance with the preferred embodiment of the method of the invention, the above methodologies are based upon the sending and receiving of:

discrete one-way and/or echoed packets streamed one-way and/or echoed packets multi streamed one-way and or echoed packets uni and bi-directional file transfers multi streamed file transfers.

processor-bound transactions

I/O-bound transactions general transactions.

These packets and files comprise transmission and receipt of industry standard packet and frame-types (e.g., TCP/IP "ping" and "FTP"), as well as frames with specialized header and/or data content (e.g., time-stamps and sequence numbers), as well as application specific transactions.

Various functions performed by the method of the invention may require some or all of the above send/receive sequences. For example, certain functions can be performed just by sending isolated pings, with no requirement for transmission of streamed pings or file transfers. In other instances, all functions may be brought to bear to perform an analysis. End processor testing across the network can involve transmission of voice, isolated frames of data, streamed data, or any combination of these transmitted at any priority. The analysis can involve consideration of any or all among past transmissions and network test results that have been stored, monitoring the current status of the networked system, and predicting future performance based upon what-if type analysis.

In accordance with the preferred embodiments of the invention, specified facts regarding the transmission and receipt of these files and packets are calculated and/or recorded. These facts include, but are not limited to, number of packets sent, number of packets received, time stamp of when packet was sent, time stamp of when packet was received, number of bytes in packet, packet one-way and/or round trip time, best/average/worst/standard deviation for packets of each length sent in a given sequence, and total bytes sent/received in a given unit of time. Any of these values may be collected for end system transaction tests as well.

Packet and file sending and receipt is performed from work station 22, which may be a dedicated network management station or stations, a station temporarily attached to network 20, devices in the middle of the network 20 capable of running code 30 executing the methods of the invention, or other user stations (e.g., clients or servers) attached to or in network 20.

Data concerning packet and/or file transfers and receipts data is stored in data store 28 and analyzed to determine, for example, but not limited to, the current performance of network 20 (including adherence to service-level agreements), the capacity limits of the network, and the current utilization of the network. The stored data is also used for analysis of "what if scenarios" involving analysis of the effect on network performance and capacity of user-specified changes to network bandwidth, changes to server or client location (e.g., data center move), implementation of network devices with changed latencies, or increase or decrease of network utilization. The data that is obtained and stored is also used for network tuning recommendations (e.g., connection window sizes) and to assist in problem determination and capacity planning (e.g., determining the network utilization level at which a specified service level will be compromised). This data is also used for service level compliance and network availability reporting.

Figure 3:
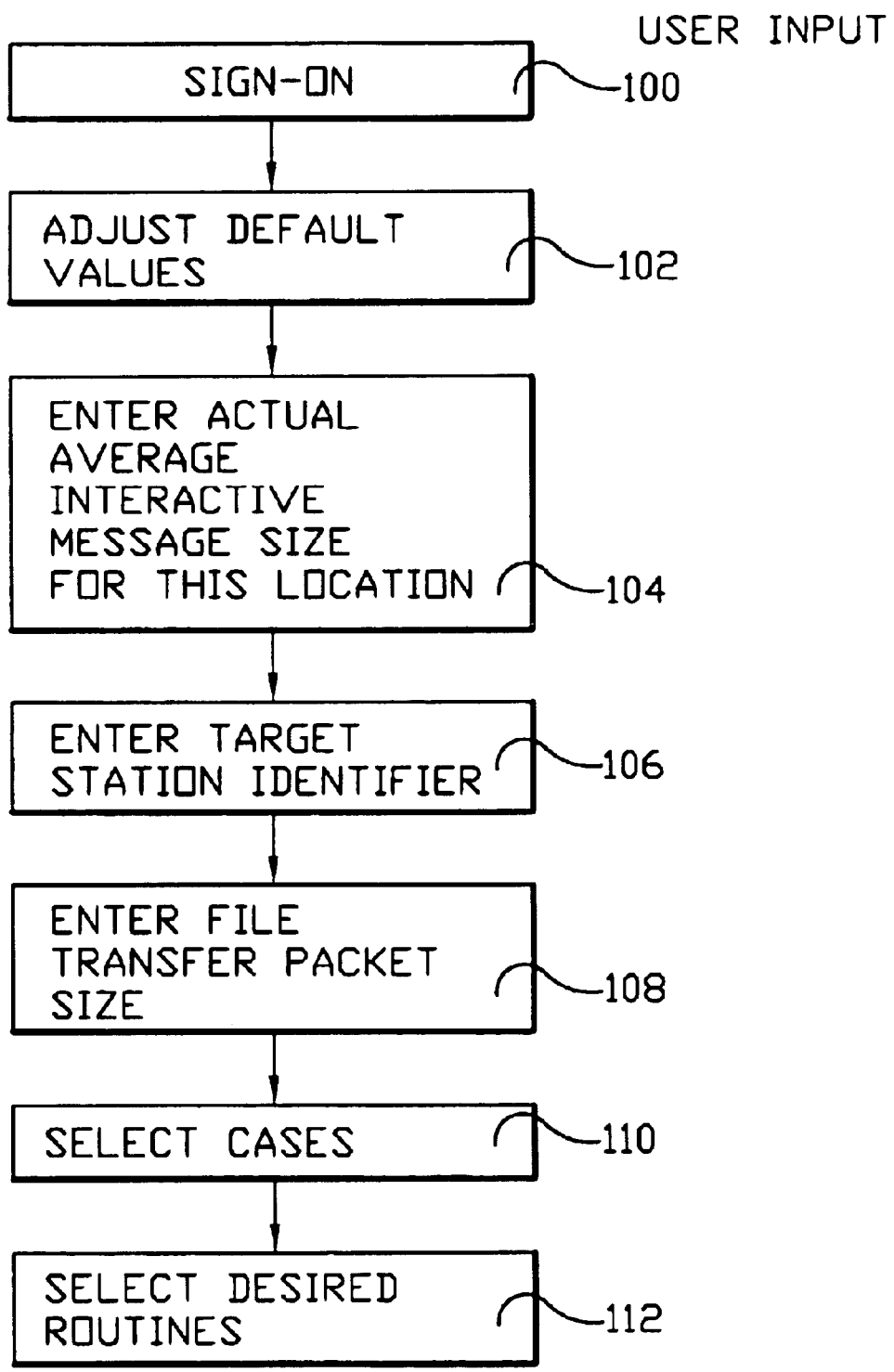
FIG. 3 illustrates a representative logic flow for user input.

Referring to FIG. 3, a flow chart is depicted in which program code or microprocessor-based microcode in a management function on a user, server, peer, management, or other device 21, 23, or 25 attaches to the network 20 and performs a sequence consisting of probative testing and analytical steps from which the capacity and utilization of the entire end-to-end system and its component end processor and network parts are stored, displayed, and retrieved, thereby reflecting the past and present condition of the networked system. Furthermore, with user input of proposed changed conditions, the future capacity, utilization, and performance of the networked system are calculated and reported or displayed.

Referring further to FIG. 3, in accordance with the preferred embodiment of the method of the invention, in step 100 the user signs on through input device 26 to the apparent network speed analysis application (ANSA) 30.

In step 102, the user adjusts default values, if desired. These default values include number of short or long pings and transactions, number of bytes per ping, and time between pings and transactions, as well as whether ANSA's network calculation is to be based upon a default value for average network message length, a user input value for average network message length, or a value that the system calculates.

In step 104, the user enters the actual average interactive message size from this location, if desired, for the actual window size calculation (User Window Size Calculation) below.

In step 106, the user enters the IP address (or name) of the target station 24.

In step 108, the user enters the file transfer packet size.

In step 110, the user selects any or all of hop count, duplex, and streaming file transfer cases if throughput analysis is desired.

In step 112, the user selects a desired interactive (transaction response time-oriented) window recommendation routine and/or batch (file transfer) window estimation routine.

Figure 4:
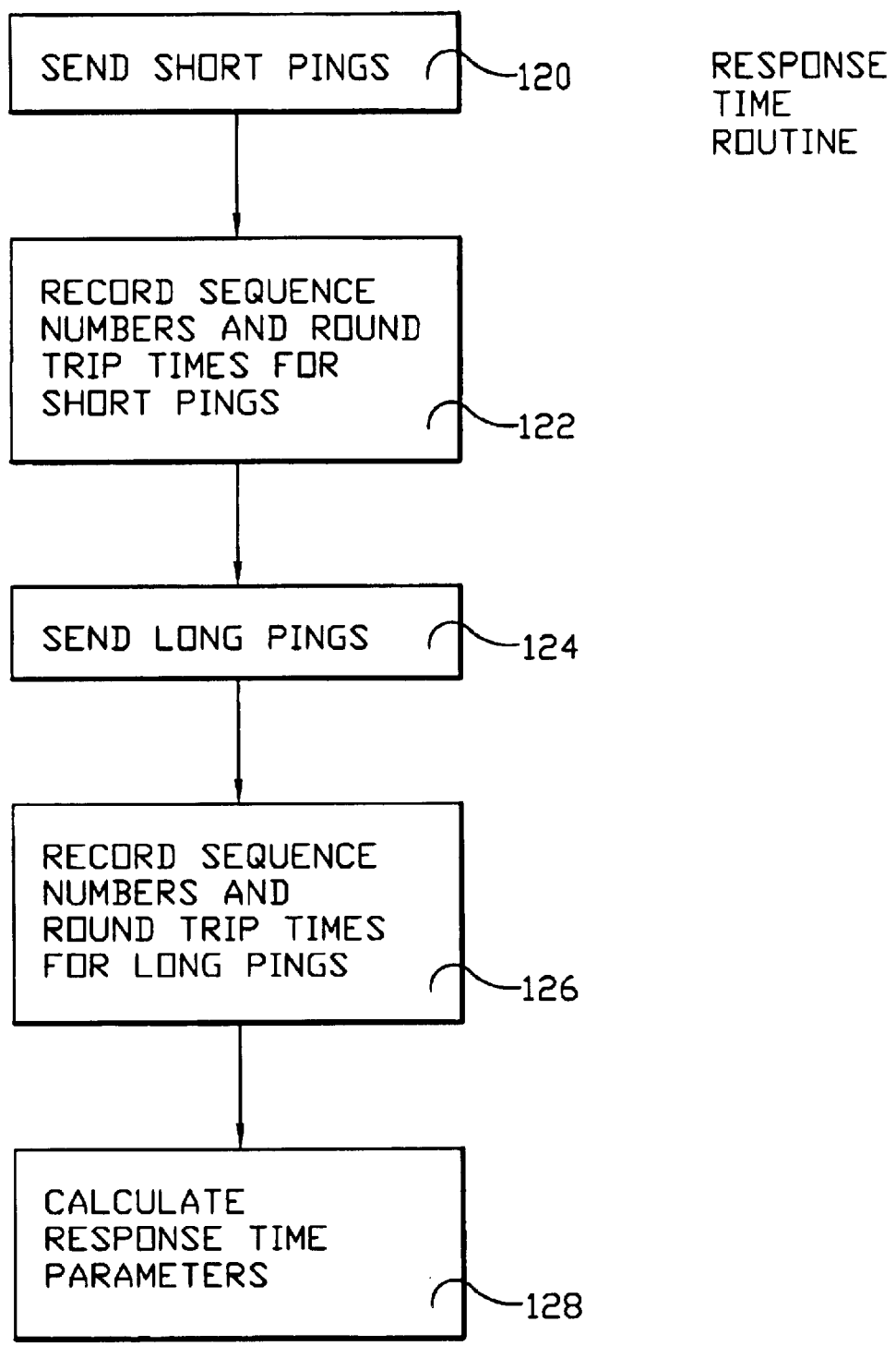
FIG. 4 illustrates the logic flow of the response time network and transaction routine of the preferred embodiment of the invention.

Referring to FIG. 4, in accordance with a preferred embodiment of the invention, the apparent network speed analysis application (ANSA) 30 performs its response time routine 32.

In step 120, ANSA 30 sends to target station 24 over communications network 20, for example, 10 short pings of 64 bytes, 10 ms apart, unless modified in step 102 to new values.

In step 122, ANSA records the sequence numbers and round trip times for the short pings.

In step 124, ANSA sends, for example, 10 long pings of 1464 bytes, 10 ms apart, unless modified in step 102 to new values.

In step 126, ANSA records the sequence numbers and round trip times for the long pings.

In step 128, ANSA calculates, in a manner to be more fully described hereafter, response time parameters, including the following values, from the set of long and short pings: apparent bandwidth, current available bandwidth, current unavailable bandwidth, apparent utilization, apparent latency, average queue time, apparent queue depth, apparent queue factor, apparent average network message length, apparent maximum user window size, estimated current user window size, apparent jitter, estimated path propagation delay, apparent device latency, estimated optimal network service level, estimated current network service level, and estimated network utilization level at which service level compliance is compromised.

In the calculations described in Klassen & Silverman, ANSA 30 treated pings that timeout (no response received) effectively as 100% utilization events in the calculations and thus as having consumed the user specified ping timeout value. In the present invention, pings that timeout are proportionately considered to be indicators of events of over 90% utilization and thus provide the basis for determination of the network average message size and the network utilization, as will be more fully described hereafter.

Figure 5:
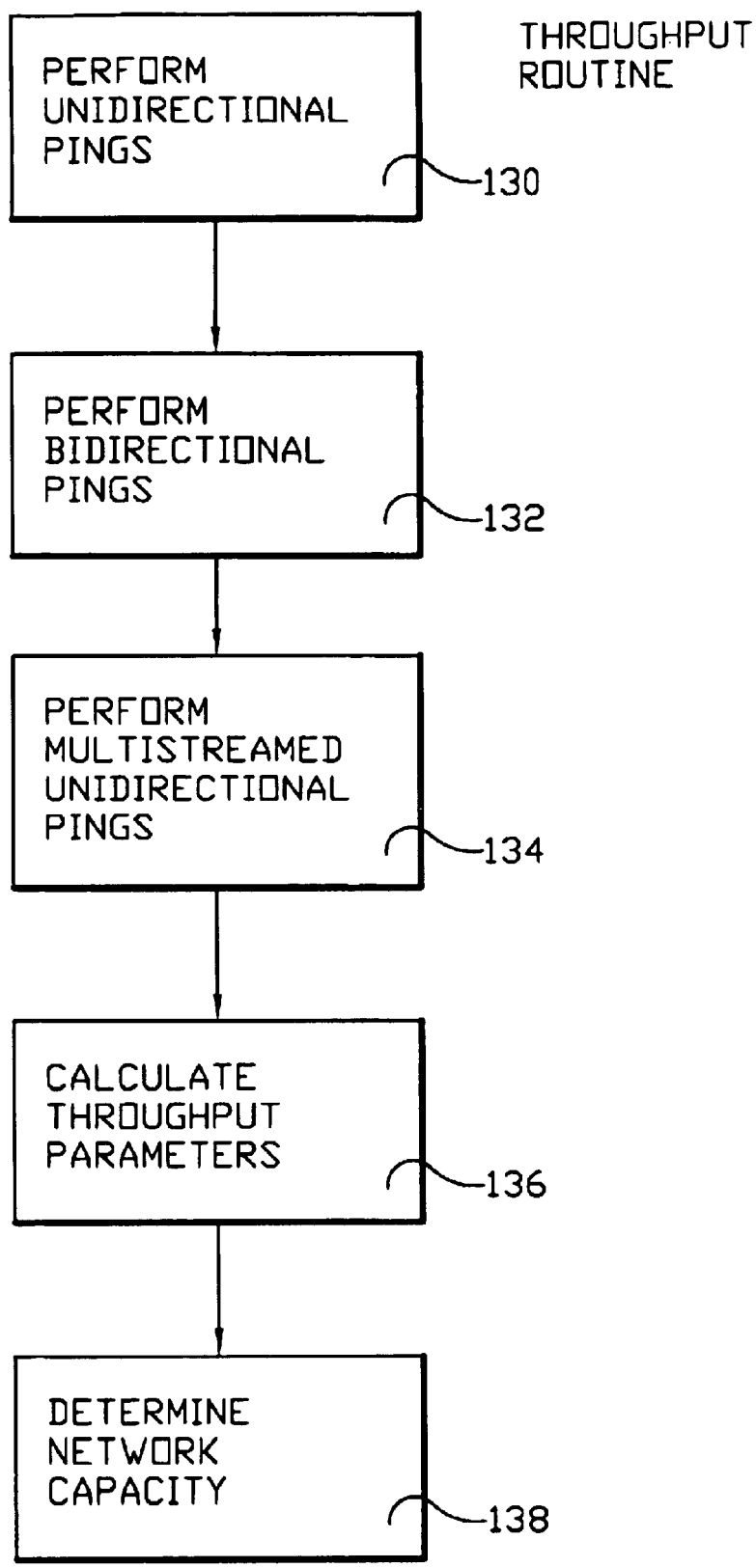
FIG. 5 illustrates the logic flow of the application and network throughput routine of the preferred embodiment of the invention.

Referring to FIG. 5, in accordance with a preferred embodiment of the invention, the apparent network speed analysis application (ANSA) 30 performs its throughput routine 34. Responsive to user selection of cases or functions in step 110, ANSA performs any or all of the functions in steps 132–138:

In step 132, ANSA 30 performs a unidirectional file transfer (FTP) or stream of unidirectional (non-echoed) pings.

In step 134, ANSA 30 performs a bi-directional, concurrent file transfer or stream of echoed pings.

In step 136, ANSA 30 performs a multi streamed file transfer or unidirectional set of pings. By multi streamed is meant that multiple sockets and/or multiple network adapters are concurrently used to access the same target workstation.

In step 138, ANSA 30 determines network capacity by calculating such throughput parameters as hop count, duplex, and total throughput factors, as will be described more fully hereafter.

The mathematics for testing the network and determining the network latency, average queue delay, apparent bandwidth, streaming bandwidth, utilization, and various other measures described in the parent application by Klassen & Silverman include the following, formulas (1) through 22.

Apparent bandwidth (the actual maximum amount of bandwidth available, from a response time perspective, between the ANSA test station and the target station)—
Formula:

$$(\text{long ping bits} - \text{short ping bits}) * 2 / (\text{best long ping } ms - \text{best short ping } ms) = \text{apparent bandwidth} \quad (1)$$

Apparent bandwidth is an unitary measure of the actual effective end-to-end wire speed or bandwidth of the entire set of network components connecting stations across the network insofar as they support interactive response time. Data used in formula (1) is obtained by sending packets of different lengths. Priority bits (e.g., TCP/IP type of service) are used to distinguish levels of service in the network.

Current available bandwidth (the actual amount of bandwidth available between the test and target stations that is not currently in use by other stations)—
Formula:

$$(\text{long ping bits} - \text{short ping bits}) * 2 / (avg \text{ long ping } ms - avg \text{ short ping } ms) = \text{current available bandwidth} \quad (2)$$

Current unavailable bandwidth (the actual amount of bandwidth between the test and target stations currently in use by other stations)—
Formula:

$$\text{apparent bandwidth} - \text{current available bandwidth} = \text{current unavailable bandwidth} \quad (3)$$

Apparent utilization (the percentage of the apparent bandwidth that is currently in use by other devices sharing portions of the network path)—
Formula:

$$(\text{current unavailable bandwidth} / \text{apparent bandwidth}) * 100 = \text{apparent utilization} \quad (4)$$

Apparent latency (the sum of all propagation delays plus all device processing delays within the network between the test and target stations, one way). Without loss of generality, best long ping result or averaged combination of best long and best short ping could be used.
Formula:

$$(\text{best short } ms - (\text{number of short bits} / \text{apparent bandwidth})) / 2 \quad (5)$$

Average queue (the time in ms that 50th percentile packets (#) spend on queue). Without loss of generality, long ping or averaged combination of long and short pings could be used.
Formula:

$$(\text{average short } ms - \text{best short } ms) / 2 = \text{average queue } ms \quad (6)$$

Apparent queue depth (the average number of bytes in network buffer and processor queues between the test and target stations)—
Formula:

$$\text{apparent bandwidth} * \text{apparent queue depth} / 8 = \text{apparent queue depth (two way)} \quad (7)$$

Apparent queue factor (the average number of packets in network queues between the test and target stations, round trip, assumes MM1, single server queuing.)
Formula (apparent utilization is expressed as a decimal in this formula):

apparent utilization/(1−apparent utilization)=apparent
    queue factor     (8)

Apparent queue factor is used for end-to-end network measurement, and is derived from apparent utilization.

The apparent queue factor formula in (8) is for single server queue systems. This can be adjusted for multi server queue analysis by using the multi server factor derived from the previously described throughput tests (b), (d), (e), (f), and (g) compared with the discrete packet send tests results of (a) and (c), as follows:

(8.1) Compare discrete ping result's apparent bandwidth with FTP determined bandwidth. FTP bandwidth should be greater than or equal to apparent bandwidth. Theoretically, in a 2 hop network 20 with equal speed hops, FTP bandwidth will be twice the apparent bandwidth.

(8.2) Compare the streamed ping (or a bi-directional FTP) bandwidth to the FTP bandwidth. If the network is full duplex, theoretically, the streamed ping bandwidth will be twice the FTP bandwidth.

(8.3) Compare the multi stream FTP (i.e. a file transfer or unidirectional ping stream to separate sockets for true concurrency) to the single FTP. It should be greater than or equal to the single stream. If so, the ratio represents the "multi server factor," used in queuing theory in utilization formulas. In ANSA 30, utilization is used to derive the network message size. For a multi server factor of value n, n would be used as an exponential value in the formula. Using the notation "3^2" to mean "3 to the power 2", the formula for a system with n servers (a factor of n), the apparent bandwidth is adjusted to the value of an FTP or streamed ping (or multi stream version of either of these), by calculating the utilization 'u', and then using the formula $u^\wedge n/(1-u^\wedge n)$,     (9)

to derive the apparent queue factor, from which the network's average message size may be derived. Mathematically, for a given utilization and queue depth, as n (number of servers) increases, the queue factor decreases, which means message size is greater (i.e., there are fewer, but larger messages). This is important for predicting both response time and variation in response time.

Apparent average network message length (the average length of all queued and in service messages from all users between the test and target systems)—
Formula:

apparent queue depth/apparent queue factor=apparent average network message length     (10)

Apparent maximum user window size (the connection-level window size, based upon average user message length, in bytes, one way, input by the user)—
Formula:

(((average user message length+acknowledgment message length)*8)/apparent bandwidth)+apparent latency)/average user message length     (11)

The derivation of apparent maximum user window size involves apparent bandwidth. It is illustrative to compare this concept with apparent utilization and apparent average network message length. These latter two are new concepts that apply what had previously been construed of only on a hop-by-hop basis to the network across all hopes. Maximum window size is a concept which has always applied end-to-end, but heretofore has been derived from a hop by hop analysis.

Estimated current user window size—
Formula:

(((average user message length+acknowledgment message length)*8)/current available bandwidth)+apparent latency)/average user message length=estimated current user window size(12)

Apparent jitter (the statistical variation between ping results expressed as the standard deviation)—
Formula:

(standard deviation of short pings+standard deviation of long pings)/2     (13)

Estimated path propagation delay (user inputs one way mileage between end points and a network quality factor of between 1.5 and 2.5, default=2)—
Formula:

(one way mileage/186000)*network quality factor=estimated path propagation delay     (14)

Without loss of generality, kilometers or other measure of distance can be used, as can use of other network quality default ranges. Estimated path propagation delay is, in accordance with the invention, derived from the network quality factor. The network quality factor is a constant value derived either from general experience or from specific testing of a given connection. For current high quality, wide area network connections, such as over AT&T, WorldCom, Sprint, and Nippon Telephone and Telegraph) a default value of 2 is appropriate. The value is best derived by point to point pinging over an otherwise empty network connection between devices separated by a wide area network for which the connection's distance and end-device latencies are known. Then total ping bits*2 is divided by apparent bandwidth to get the ping round trip service time. Each end device latency is multiplied by two to get round trip device latency. The distance (in miles)*2/speed of light (in mph) yields the round trip speed of light delay. Then, round trip ping time−(round trip service time+round trip device latency+round trip speed of light delay) yields the round trip network quality delay time. Then, network quality delay time/round trip speed of light equals the network quality factor. This represents the proportion of time that a wide area network providers' network equipment, routing, and physical delays increase the propagation delay over that expected merely by the speed of light factor.

Apparent device latency (processing time total for the network devices along the path)—
Formula:

apparent latency−estimated path propagation delay=apparent device latency     (15)

In accordance with the invention, apparent device latency is derived by viewing the network as a single device with a singular latency value.

Estimated optimal network service level (based on user input of application-level input and output message lengths)—
Formula:

(user message length/apparent bandwidth)+(apparent latency*2)= estimated optimal network service level     (16)

Estimated current network service level (based on user input of application-level input and output user message length, without loss of generality for 50th percentile responses)—
Formula:

(user message length/apparent bandwidth)+(average queue time+
apparent latency)*2=estimated current network service level(17)

Estimated network utilization level at which service level compliance is compromised (user inputs a time value, t, and ANSA 30 determines the network utilization level that will cause, without loss of generality (for this could be done for 90th or any other percentile), an average response time of t in this network.)
Formulas: first perform an internal mathematical check that estimated optimal network service level 'a' is less than or equal to 't', the target value, where $$a=[\text{network latency}+(\text{number of bytes per message/apparent bandwidth})]. \quad (18)$$

If t>a, no further calculation is performed and the service level is flagged as unattainable.
If a=t then utilization must be 0%.
If a<t, then, subtract, $$t-a=q, \quad (19)$$

so that q is the maximum allowable average queue time that will comply with the required average network response time service level, t. Utilization 'u' is derived by determining the queue factor that will result, on average, with a value of q. Having previously determined the apparent bandwidth of the network 'b' and the average network message size 'm', perform $$(q \times b)/8=z, \quad (20)$$

so 'z' is the number of bytes on network queues. Then divide, $$z/m \quad (21)$$

which is the network queue factor at which response time equals t. The utilization level 'u' at which this occurs is:

$$u=((z/m)/(1+(z/m)))^{\wedge}(1/n). \quad (22)$$

where u is the utilization in decimal, so multiply by 100 for percent. From formula (22) 'n' is the indicator of the multi server factor of the network. For the single server queue case (also referred to as the MM1 case), or where throughput testing will not be performed, n=1. Therefore, u represents the maximum utilization level at which service level compliance can be achieved on average.

Important aspects of the preferred embodiment of the invention in Klassen & Silverman are set forth in the formulas (18)–(22) for estimated network utilization at which service level compliance is compromised, for both ANSA end-to-end type network performance and network queuing analysis, as well as for "non-ANSA" hop by hop traditional analysis. These are further described in Klassen & Silverman.

Network managers and planners are interested in current performance of the network with respect to service level targets and in "what-if" planning scenarios. Four routines describing how the probative testing results and the application of the above queuing theory concepts and formulas apply to service level attainment and what-if planning scenarios are described in Klassen & Silverman, the teachings of which are incorporated by this reference.

Figure 6:
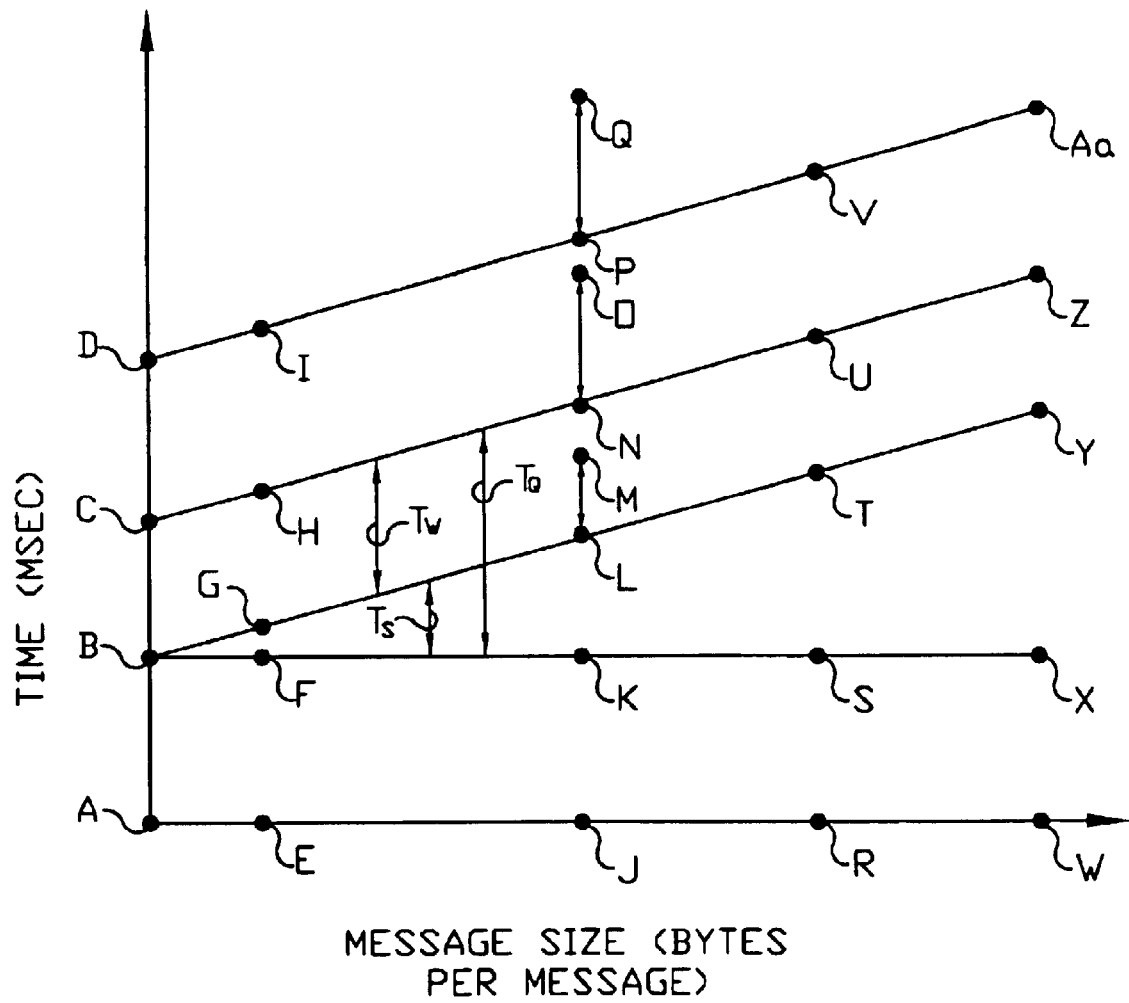
FIG. 6 geometrically illustrates ping and transaction results and bandwidth, utilization, and message size derivations in accordance with the preferred embodiment of the invention.

Referring to FIG. 6, a geometric depiction of ping and transaction results and bandwidth, utilization, and message size derivations (based on the slopes of lines, perpendicular intercepts, and other geometric relations), and transmission of transactions across the network so as to enable analysis of the transactions for the portion of time spent in the network and portion of time spent within the network-attached intelligent processors is illustrated. Table 1 provides a description of each point in FIG. 6, and definitions of selected line segments. A line segment may be defined by its end points, such as E,W or L,M.

TABLE 1

| FIG. 6, POINTS AND LINE SEGMENTS DEFINITIONS | | |
|---|---|---|
| POINT | LINE SEGMENT | DESCRIPTION |
| A | | ORIGIN |
| | A,B | PROPAGATION DELAY, SAME AS (AKA) |
| | W,X | NETWORK LATENCY |
| | B,X | NETWORK LATENCY TIME |
| | B,Y | SERVICE TIME |
| | C,Z | AVERAGE NETWORK RESPONSE TIME |
| | D,Aa | WORST TRANSACTION TIME, WITHOUT DROPPED FRAMES |
| E | | SHORT TEST BYTES PER MESSAGE |
| F | | NETWORK LATENCY, PROPAGATION DELAY |
| G | | TIME FOR BEST SHORT MESSAGE |
| H | | TIME FOR AVERAGE SHORT MESSAGE |
| I | | TIME FOR WORST SHORT MESSAGE |
| J | | TRANSACTION BYTES PER MESSAGE |
| K | | NETWORK LATENCY, OR PROPAGATION DELAY |
| L | J,L | TRANSACTION NETWORK TIME, BEST POSSIBLE |
| | K,L | TRANSACTION TOTAL NETWORK TIME ABSENT QUEUING |
| | L,M | TRANSACTION TIME FOR BEST TRANSACTION |
| M | | BEST TRANSACTION |
| N | | TRANSACTION AVERAGE NETWORK PORTION |
| O | | AVERAGE TRANSACTION |
| | N,O | TRANSACTION TIME FOR AVERAGE TRANSACTION |
| P | | WORST TRANSACTION NETWORK TIME |
| Q | | TIME FOR WORST TRANSACTION |
| | P,Q | TRANSACTION TIME FOR WORST TRANSACTION, FOR CASE OF DROPPED FRAMES |
| R | | LONG TEST BYTES PER MESSAGE |
| S | | NETWORK LATENCY, PROPAGATION DELAY |
| T | | BEST LONG MESSAGE TIME |
| Ts | | AVERAGE MESSAGE SERVICE TIME |
| Tw | | AVERAGE NETWORK WAIT TIME FOR SERVICE |
| Tq | | AVERAGE TOTAL QUEUING TIME |
| U | | AVERAGE LONG MESSAGE TIME |
| V | | WORST LONG MESSAGE TIME |
| W | | AVERAGE NETWORK MESSAGE BYTES |
| | X,Y | AVERAGE MESSAGE SERVICE TIME, Ts |
| | X,Z | AVERAGE TOTAL QUEUING TIME, Tq |
| | Y,Z | AVERAGE NETWORK WAIT TIME FOR SERVICE, Tw |
| | Y,Aa | WORST TOTAL QUEUING |
| | =>B,Y | QUEUING |

Referring again to FIG. 6, the x-axis, depicted as Series (A,W), represents bytes per message, increasing as it moves from point A towards point W. FIG. 6 generically depicts a hypothetical test case in which points E, J, and R located on Series (A,W) represent the number of bytes in test short pings, transactions, and long pings, respectively. The y-axis, Series (A,D) represents time in milliseconds, increasing as it moves from point A towards point D. Series (B,Y) represents the best individual ping results. In the example, point G represents the best short ping, and point T represents the best long ping. Points H and U on Series (C,Z) represent the average ping time, respectively for all short and long ping test samples. Points I and V on Series (D,Aa) represent the worst sample results for short and long ping tests, respectively.

By worst sample results it is meant that these are the worst results for test packets not dropped by the network. Packet drops indicate time out conditions representing that a frame has been excessively delayed, corrupted, or lost. It is a purpose of this invention to provide improved algorithms for determining utilization of a system which is dropping test samples, and the algorithms are more fully described hereafter.

Continuing with FIG. 6, the length of a perpendicular between Series (B,X) and Series (A,W) describes the network latency. The length of a perpendicular between Series (B,Y) and Series (B,X) represents the service time for messages of different lengths, increasing in direct proportion to message length as it moves from left to right. The length of a perpendicular between Series (C,Z) and Series (B,Y) is the average queue delay in the network.

Furthermore, point J of FIG. 6 represents the number of bytes (characters) transmitted across the network and received back to complete a transaction. Based upon ping testing, points L and N can be calculated, which represent the best and average network contribution to the best and average total transaction response times, depicted as points M and O. Subtracting L milliseconds from M milliseconds, and subtracting N milliseconds from O milliseconds gives us, respectively, best transaction processor time and average transaction time. In this manner, the ping testing of the network and the transaction testing of the end processors are related so as to form a basis for the evaluation of the entire end-to-end networked system and its component parts.

It can further be observed that the all surviving short ping test packets (i.e., those not dropped by the network) will fall along a line segment interconnecting points (G,I). Similarly, all surviving long test ping packets will fall along within line segment (T,V). It is, therefore, possible to determine the standard deviation of the short packet times and the standard deviation of the long packet times.

The mathematics for testing the network and determining the network latency, average queue delay, apparent bandwidth, streaming bandwidth, utilization, and various other measures are described in the parent application by Klassen & Silverman. This invention offers the following improvements and functional extensions to Klassen & Silverman:

1. A method for calculation of utilization of the network for test cases in which test packets have been dropped by the network. The new method of calculation assigns an instantaneous network utilization value for the worst surviving ping instance of between 90% and 99% (determined proportionately from the ratio of dropped test samples to surviving test samples), and then back solves for average network message size and average utilization of the network. This method is described more fully hereafter.

2. A method for transmitting a plurality transactions of different types across the network to intelligent end systems and mathematically evaluating the results to determine:

the portion of the total response time contributed by the network;

the portion of the total response time contributed by the end processors;

the utilization of the end processor processing subsystems;

the utilization of the end processor input/output subsystems;

the utilization of the end system as a whole; and the utilization of the networked system (the network and end processors considered as a unitary entity).

Utilization must be known in order to provide problem determination, capacity planning, performance evaluation, and prediction of operation of the system or its subsystems under altered load conditions, such as is required for what if-type planning. Knowing total response time and knowing the portion of response time contributed by each component of the networked system is of critical importance for network and system monitoring and troubleshooting. The ability to perform capacity planning, monitoring, and troubleshooting tasks in current network and processing environments has become extremely difficult because current monitoring, performance estimation, and capacity planning techniques, tools, and methods require building up a picture of the whole by compiling a detailed depiction from the sum of the parts. This is no longer possible to do in many of the most critical cases, because portions of large networks are either undocumented or inaccessible, and end system connections frequently involve equipment the management information for which is inaccessible. This is easily understood when considering that in an e-business connection across the internet, neither the equipment in the internet nor the end processor across the internet are accessible for management purposes from the other side of the connection. In other words, those responsible for providing a service cannot see, for management purposes, into the internet or into the end user system across the internet. In effect, they are blind to two thirds of the networked system comprised of their processor and network, the internet, and the user processor and network. The methods, algorithms, calculations, and concepts introduced in Klassen & Silverman together with the improvements and expanded functions of this invention, provide an easy means for testing and analyzing these types of connections, in spite of the fact that probes, network management tools, sniffers, and other types of diagnostic and recording equipment can no longer be connected to many intermediate and end devices in such connections.

Those skilled in the art of queuing theory will recognize that the network average message size and the network utilization are directly related. The inverse of the slope of Series (B,Y) defines the speed of the network. (For test pings sent in isolation, the resultant speed is referred to as the apparent bandwidth, which is the network transmission speed with respect to isolated packets such as is experienced by Telnet application traffic. This speed is geometrically expressed by means of FIG. 6 as the inverse of the slope of Series (B,Y). For test pings sent in bursts, the slope represented by Series (B,Y) will, in multihop networks, be lower than that of isolated ping tests, and the bandwidth higher, because ping burst tests determine the network streaming bandwidth such as is experienced by file transfer application traffic. For a small message size, such as point E, the ratio of average productive use of the network, line (F,G), to unproductive average wait time, line (H,G), is low; while the ratio for a larger message size, such as point R, of productive use of the network, depicted by line (S,T), to unproductive wait time, line (U,T) is high. The method of this invention and of Klassen & Silverman includes performing long and short ping tests in isolation and in bursts to construct the mathematical equivalents of FIG. 6 for the isolation tests and for the burst tests. (Note that latency and average queue delay values are taken from the isolated test cases and not, generally from the burst tests). Performance of the tests yields, via FIG. 6, the apparent and streaming bandwidth, hop count, multi server factor, and queue depth in bytes of the network. If the user wishes to take a default value for average network message size, or wishes to input a value for average network message size, then superimposing that value on the FIG. 6 depiction of the test results gives the ratio of productive versus unproductive time in the network which, together with the network speed (as derived by inverse of the line (B,Y) slope, gives total bandwidth and the proportion of bandwidth that is currently available and currently unavailable, and hence, the current utilization.

Method for Testing Performance and Utilization of Servers by Transmission and Analysis of Transactions A transmission of a transaction from one network attached station 21 to another network attached station 25 will ordinarily result in an individual frame or burst of packets to be sent across the network 20 which will be processed by the target station 25 which will then formulate a response and transmit the response back to station 21 in an individual packet or a burst of packets.

It is also possible that voice or video signals be transmitted and received, or that a series of turn around of individual packets and/or bursts may be required to complete a transaction. While complex, analysis of these cases is extrapolated from the discussion that follows, together with the methods described in Klassen & Silverman. Voice and video, when packetized, consists of streaming (sending packet bursts) at a particular rate, together with a requirement for a specific tolerance level for packet jitter. Multiple turnarounds require analysis that is simply the sum of a set of response time and/or burst traffic analyses.

This analysis is not intended only for data processing server or client machines. It is also intended for any device with intelligence to attach to a network and respond to probative packets of any sort and also, possibly, to perform a process when stimulated by some other entity. This includes any devices in what is referred to as the pervasive computing environment.

The invention provides a method for analyzing performance of devices with any level of intelligence that are attached to networks in such manner as to provide analysis of the performance of the network connecting such a device and another station, and also the devices themselves, so as to enable full analysis of the network contribution to delay in responsiveness, and also to enable full analysis of the end stations contribution to delay in responsiveness. The results of such analyses are stored and provide for a full what-if type analysis of the network, the end stations, and the network and end processors when considered as a whole, which is referred to as the networked system.

Referring further to FIG. 6, a geometrically and graphically depicted test environment is presented in which test packets (pings) and transactions have been sent by a test station (or equally well by another network attached station not dedicated to testing) to a target station which sends responses by echoing pings and responding to transactions.

As described earlier, transactions can be of any or all of three kinds:
 processor-bound transactions that stress the target station processor much more than its data entry and storage retrieval facilities;
 I/O-bound transactions that stress the target station data entry and storage retrieval facilities much more than its processor; and
 general transactions that stress both the target station processor and its data retrieval and storage facilities.

The description of the method below covers only a general transaction. This is done without loss of generality, as the method for combining results of different transactions is subject to the user concept of in what proportion, if any, to combine results as part of an analysis.

Klassen & Silverman and the section above describe a new method for calculating network utilization provide a complete means of analyzing a network by attaching a station to the network, sending probative packets of various sizes individually and in bursts, recording and analyzing the results. FIG. 6 is a geometric representation of many, but not all resulting algebraic calculations. FIG. 6 also contains geometric expressions of time stamps that are obtained by recording at a test station or another location the time stamps of transactions transmitted from the test station to a target station, and time stamping responses received, along with the number of bytes for each frame transmitted and received. The information on numbers of bytes transmitted and received is easily obtained from packet headers. In addition to time stamping and recording, various analytic processes are performed as described below both algebraically and analytically.

Referring again to FIG. 6, point K represents the number of bytes, round trip required for performance of a general transaction requested from a test station. The network response time for transaction of K bytes is determined from the analysis of the network that was performed by the transmission of test pings. Network response time has three components:
 latency (which includes propagation delay and network device processing delays) whose algebraic derivation is geometrically depicted as a line segment interconnecting points J,K;
 service time, denoted as Ts and also called serialization time, whose algebraic derivation is geometrically depicted by a line segment interconnecting points K,L; and
 queue delay, denoted as Tw and whose algebraic derivation is geometrically depicted as a line segment interconnecting points L,N.

Point M denotes the best observed total response time for a general transaction, which is comprised of network response time and the network attached processor internal response time (for the processor and I/O-bound portions of the general transaction). The best observed total response time for the transaction will be an instance in which there is no queuing for service in the network and no queuing in the network attached processor. This best total response time is depicted by line segment J,M, of which line segment J,L is the network response time component and line segment M,L is the processor component.

Testing by means of transmission of a plurality of transactions from the test station to the target station will also yield an average total transaction time. This average time as compiled from the plurality of transmissions and responses will consist of an two average components, an average network time and an average station processor time. Network testing will have revealed the network average queue time (line segment L,N), so line segment J,N represents the total network response time for the average transaction. Thus, the total average transaction time, represented by line segment J,O, minus the average network response time J,N, yields the average transaction processing delay represented by line segment O,N.

Network testing and analysis by the methods described in Klassen & Silverman together with the foregoing provide a method for determining utilization of the network, the network average message size, and the network bandwidth. The network bandwidth is the reciprocal of the slope of line segment B,Y. And, supposing that the average network message size were w bytes (point W in FIG. 6), then the ratio of the times represented by line segment Z,Y to line segment Y,X (i.e., time Z,Y divided by time Y,X) expresses the number of messages in the network queue. As earlier described, this number, call it n, is converted into percent average network utilization by performing the calculation (u=n/(1+n)*100).

As described in Klassen & Silverman, once utilization, latency, network average message size, and network speed have been determined, what-if calculations involving changes in device locations or network processors (i.e. latency changes), network bandwidth, or utilization are achievable. As for performance evaluation of the processor components of the connection, a best general transaction time and an average general transaction time have been calculated. The ratio of average processor queue time (the number of milliseconds depicted by line segment O,N) divided by processor time (i.e., processor time when no processor queue is present, depicted by line segment L,M) equals the number of transactions on queue, which can be converted to a processor utilization number, for the general transaction. Where u is utilization in percent and n is the number of transactions queued, the formula is (u=(n/(n+1)*100).

As described above, testing for the presence of a multi server transaction processing system can be performed by transmitting a plurality of simultaneous transactions. Should a multi server environment be detected (e.g., by receipt of transaction responses in succession faster than the best possible from an individual server), the multi server formulas described earlier can be used for determination of utilization.

In addition, the transmission of transactions that are processor bound or I/O bound can be performed in concert with the general transactions described above. Response time and utilization calculations would proceed as in the case of general transactions. The user could then view the processor system as a composite of three queuing systems (processor, I/O, and both) and average out the three utilizations into a composite for the device, or devices in the case where a multi server environment has been detected.

In accordance with the present invention, there is provided a unitary utilization number for a networked system considered as a singular entity. Using the general transaction depicted in FIG. 6, this can be accomplished from the ratio of average network and processor time (line segment K,O, which has network latency removed as it is irrelevant to utilization) minus best transaction time (line segment K,M) and taking the result (which is line segment M,O) and dividing by best transaction time with network latency removed (line segment K,M). This gives the queue depth in network and processor messages for the system and that queue depth, represented as n items, yields a utilization percent number by means of the formula (u=n/(1+n)*100).

Alternatively, and preferably, the network utilization number, as derived not from transaction message length, but from the average network message length, can be combined with the general transaction utilization number in proportion to the resources consumed by each. This is done by taking a weighted average by summing queue times from network wait time (line segment Z,Y) plus processor wait time (line segment N,O) and then dividing this sum by the sum of the best times for transaction processor time and the non-latency portion of best average network message size (line segment X,Y plus line segment M,L). This yields a number of messages in the networked system queue, which, if called n, allows calculation of the total system utilization in percent by means of the formula: (u=n/(n+1)*100).

Finally, the method for calculating network utilization when test samples are dropped (no response received) described above can be applied to the processing system as well as to the network.

Suppose 10 transaction samples are sent in isolation, and 9 responses have been received. Suppose further that network utilization is low, and no network ping packet drops are detected (or that the proportion of transaction drops consistently outweighs the proportion of network ping drops). In this case the worst surviving transaction time (line segment P,Q) is considered, per the algorithm described earlier, as a 90th percentile case for the processor queue. This provides a measure of the average transaction within the processor and the calculation is: at 90% utilization the queue depth in transactions is (u/(1−u)=0.9/(1−0.9))=nine transactions. Next, divide 9 by the number of milliseconds in line segment P,Q. After removing latency J,K from the worst response time, the number of milliseconds in line segment P,Q is worst surviving transaction minus worst ping corrected for number of bytes by accounting for the difference in bits between transaction bytes and ping sample bytes.

In this situation, it is necessary to have sampled the network at a time when the same proportion of drops now experienced in the processor was then experienced in the network. Since test results are stored, this is likely a matter easily accomplished by a database search, provided that sufficient testing has been performed over time. In this manner, true utilization numbers for the network and attached intelligent devices can be derived, and a full accounting of performance and response time characteristics can be given for the networked system and its components, together with a full what-if analysis by means of queuing theory.

This invention automates the process of determining the network average message size. Geometrically, with respect to FIG. 6, what this means is that, previously, the system constructed the graph of FIG. 6 and located short ping test samples between points G and I, and long test samples between T and V, and then performed utilization analysis based on a user input value along the x-axis on the line A,W. This invention improves upon that method by providing methods for automating the determination of the network average message size and also by including additional testing and analysis methods for testing intelligent processing systems at the ends of the network, and not just the network itself, and, further, relating the network tests and processor tests in such a manner as to provide a full analysis of each, including application of queuing theory for capacity planning of the system as a whole and its components.

New Method for Calculating Utilization

As described above, per Klassen & Silverman, a fixed number of short pings are transmitted in isolation from each other and received back from a target system across the network. A fixed number of long pings are transmitted in isolation from each other and received back from a target system across the network. The transmission and receipt time stamps are recorded. Subtracting transmission time from receive time gives the round trip time for each packet. The sum of the round trip times divided by the number of packets successfully sent and received gives average round trip time for short pings and, similarly, for long pings. The best and the worst times for long and short pings are also noted, which is easily accomplished by means of any sorting routine. The network apparent bandwidth is calculated by subtracting the number of short ping bits from long pin bits, multiplying by two (to account for the round trip transmission), and dividing by best long round trip time minus best short round trip time. By transmission of bursts of short packets and bursts of long packets and by means of file transfers or one way pings with discard and by means of simultaneous bursts of pings, the network streaming bandwidth is determined. Comparing results of these tests further yields values for the network duplex factor (ratio of full duplex to half duplex characteristics), hop count (ratio of one way streaming bandwidth divided by apparent bandwidth), and multi server factor (ratio of multi server to single server mechanisms detected in the network by ratio of simultaneous burst throughput to single burst throughput). In addition, the number of short and long ping test packets dropped is determined.

In accordance with the present invention, based on the above procedure of Klassan & Silverman, whether in the test sequence there were test packets dropped by the network will have been detected. If no packets were dropped, Method A is used for calculating network average message size and utilization. If packets were dropped, method B is used for the calculation.

Method A: For the Case of No Dropped Packets

A plurality of short and long test packets having been sent, the standard deviation value for short ping test times and long ping test times is easily calculated for each. Each short ping has the same serialization time and latency in the network (that pings have traversed the same path is easily verified by means of a TRACEROUTE function, or equivalent), so the time differences in their transit times are the result of different queuing time they have experienced, and the standard deviation of their receipt represents the variation in their queue delay. The average of delays for long pings and short pings is divide by two to derive the variation of delays experienced for one way transit. This value is expressed as sigma Tq, and represents the variation of queue delays experienced in the test samples one way across the network.

For a half duplex network, equal queue delays are experienced inbound and outbound. This is not necessarily true for a full duplex network, for which as a rule, delays are greater in one direction than the other. If testing has shown that the network has full duplex characteristics, the relative delays inbound and outbound may be deducible proportionately from one way and two way testing, and the delays can be adjusted proportionately to estimate the inbound queue delay and outbound queue delay and perform the calculations that follow accordingly for each of the inbound and outbound legs. As a default, in such cases, it can safely be taken that 80% of the traffic delay occurred on one leg and 20% on the other, and the calculation can simply proceed on that basis.

For the half duplex case, the formula for variation of queue delay, one way through the network is: sigma $Tq=Ts/(1-u)$, where Ts is the service time for the average message in the network, u is the average network utilization expressed in decimal, and sigma Tq is a standard deviation operation taken over a set of Tq values, where Tq is the sum of wait and service times for a sample in queues and getting service. Tq and sigma Tq are related (see Stallings, High Speed Networks—TCP/IP and ATM Design Principles, Chapter 7, Table 7.5, Prentice-Hall Inc., 1998). For a single server, single hop network with wider than average range of message sizes, sigma Ts=Ts, and sigma Tq=Tq. If the network is multi server, or multihop, or has an average range of message sizes, then sigma Tq decreases accordingly, albeit slightly, for each. The value of sigma Tq is adjusted to account for these factors as follows: since sigma Tq is smaller than Tq because of degree of variation of message sizes in general network environments, and because in ping samples all messages in a set of pings are of equal length, further diminishing variation of message sizes in this measurement, a correction value is provided by multiplying sigma Tq by 1.15. Since in a multihop network not all queuing on average will be on one hop, the effect of queue delay on utilization will be lessened, and this is handled by reducing the calculated total network queue time by 5% for each of the second through fourth hops, if present. So if testing indicates presence of a network with an apparent hop count of five, $0.95^3=0.857$ (i.e., 95% to the third power) of queue time is attributed to the heaviest used hop in the apparent network. No such reduction is required on a one hop network, and on a network with more than four hops, the reduction is only performed on three hops to reflect that queuing occurs because of bursts of traffic and is not, generally, evenly spread across a network of many hops. Thus, the multihop characteristic of the network is measured on the basis that most, but not all, of the queuing experienced will probably have taken place on one hop. Since in a multi server environment, queue delays are reduced when compared with the single server environment, sigma Tq is multiplied by 1.05 times the value of the multi server factor derived from network testing. In these ways, the black box apparent network can accurately represent the multihop, multi server, half or full duplex network. This is because the testing method determines these characteristics in the real network, and queuing theory is then applied appropriately.

The calculations for average network message size and for utilization proceed as follows:

1. Unadjusted standard deviation is calculated for each the set of short ping tests and the set of long ping tests. The results are added and averaged by dividing by two. Dividing by two once more gives a one way variation value across the network, and this is the unadjusted sigma Tq value.
2. The unadjusted sigma Tq value is multiplied by 1.05, the multi server adjustment, raised to the (n−1)th power, where n is the number of servers discovered in network testing. (Example: if the multi server factor discovered by network testing were 3, then the multi server adjustment would be $1.05^2=1.1025$, so unadjusted sigma Tq would be multiplied by 1.1025.)
3. Sigma Tq is further adjusted for network message size variance by multiplying the multi server adjusted value for sigma Tq by 1.15.
4. Testing by means of isolated pings will have given a value for the network average one way network queue delay. Testing by means of bursts of pings will have given a value for the network streaming bandwidth. The queue delay time in seconds is multiplied by the streaming bandwidth to derive the total number of bits on the network queue, and this is divided by 8 to derive total bytes on the network queue.
5. Next, the network queue for multiple hops is adjusted, because not all of the queue is presumed to be on a single hop in a multihop environment. The adjustment is 0.95 to the power apparent hop count minus 1. Example: if the network queue were determined to be 1000 bytes, and the apparent hop count were 4, the queue on the hop is calculated to be $0.95^3*1000=857$ bytes. If there were five hops, the result would be the same because multihop adjustment is limited to no more than 0.95^3.)

6. At this point, sigma Tq and queue depth has been adjusted to account for the variance in service times as well as the multihop and multi server nature of the network so that the value for adjusted sigma Tq closely approaches the value for Tq.

Method B: For Determining the Network Average Message Size When Test Packets are Dropped by the Network In many instances, test frames will be dropped by the network during testing. In Klassen & Silverman, such occurrences were accounted for as instances of 100% utilization, for the purpose of averaging. For example, if ten pings were sent, eight survived, and from those eight a value of 50% network utilization was calculated, the two dropped frames are averaged in as 100% occurrences to derive a value of 60% utilization (i.e., ((8*0.5)+(2*1.00))/10=0.6).

The calculation above adjusts the utilization calculation, but not the underlying derivation of the network average message length. The following method performs both determination of the network average message length and the network utilization.

First, this method is invoked only if packets are dropped by the network during a test sequence. Suppose n packets have been transmitted, and m packets are dropped, where m is greater than or equal to one, and less than n. If m=n, then all packets have been dropped and there is 100% network utilization from which no message size calculations can be made, as this would involve division by zero.

Next, divide m by n and multiply by 100. This gives the percentage of pings that were dropped. This percentage is used to calculate a utilization value for the worst surviving ping, which is the ping with the longest round trip time that was not dropped. If ten percent or fewer test frames were dropped, a value of 90% is assigned to the worst surviving frame. If greater than ten, but less than or equal to twenty percent were dropped, a value of 91% is assigned to the worst surviving frame. Table 2 describes this aspect of the method:

TABLE 2

WORST SURVIVOR % FOR DROPPED PINGS %

| % Dropped | Worst Survivor % |
|---|---|
| through 10% | 90% |
| over 10 through 20% | 91% |
| over 20 through 30% | 92% |
| over 30 through 40% | 93% |
| over 40 through 50% | 94% |
| over 50 through 60% | 95% |
| over 60 through 70% | 96% |
| over 70 through 80% | 97% |
| over 80 through 90% | 98% |
| over 90 less than 100% | 99% |

The worst survivor percent is used as follows. Queue depth in a single server, Poisson arrival system (i.e., an M/M/1 queuing system) is calculated by means of the formula u/(1−u), where u is utilization expressed in decimal. Based on the chart above, if 35% of frames are lost in testing, the worst surviving frame is considered to be an instance of 93% utilization. This means that network queue depth, expressed in number of frames, is (0.93/(1−0.93)) w=13.29 packets.

In the course of testing, an apparent bandwidth, suitable for network response time calculations, will have been determined, as will a streaming bandwidth, which is suitable for file transfer performance calculations. The hop count is defined as the result of dividing the streaming bandwidth by the apparent bandwidth. The apparent bandwidth is, in a multihop network, less than the bandwidth of the slowest actual facility in the network path, while the streaming bandwidth is equal to the bandwidth of the slowest actual facility along the network path. (See Klassen & Silverman for additional details.) Furthermore, the best, average, and worst surviving short and long pings, will have been determined. The one way average worst delay in the network is derived by subtracting the best long and short pings from, respectively, the worst long and short pings, and dividing by 4.

By way of example, suppose that: streaming bandwidth= 2,048,000 bits/second, and average worst queue delay in seconds is 0.088.

Just above is was determined that the network queue depth at the time of the worst surviving packet transmissions was 13.29 packets. The calculation of the network average message size continues by multiplying worst queue delay*streaming bandwidth=total bits on queue= 0.088*2048000=180,224 bits. Total bits on queue is divided by 8 to derive total bytes on queue=180224/8=22528 bytes. Then, total bytes on queue is divided by messages on queue (the queue depth in messages)=22528/13.29=1620 bytes, which is the average network message size.

To determine the network average utilization, the calculation continues as follows, using the newly discovered average network message length. Suppose the average long and short pings minus the best long and short pings, divided by 4=0.019 seconds. This is the average network queue time that is experienced, one way, (denoted in FIG. 6 as Tw). The service time for an average message (denoted as Ts), is calculated by dividing the number of bits in the average message by the network streaming line speed. Turning message size bytes back into bits requires multiplying by 8, so the calculation is: Ts=1620*8/2048000=0.063 seconds. Since the network delay, Tw, is 0.019 seconds, on average, Tw divided by Ts messages=0.019/0.063=0.3 messages on queue, on average. Average utilization is calculated from average number of messages on queue, with average utilization=number of messages on queue divided by one plus number of messages on queue. In this case, u=0.3(1+ 0.3)=23%.

This method thus computed, purely by pinging, the network average message length, and the network average utilization. As described in Klassen & Silverman, response time, window size, throughput, and what if type analyses can now be performed, as the required input is available. Furthermore, if multi server queuing occurs in the network (M/M/1 denoting single server, M/M/N denoting multi server, with N servers), then the formulas newly discovered in Klassen & Silverman can be applied, namely, q=u^n/(1− u^n), where "q" is the average number of items on queue at utilization percent "u" (expressed in decimal), "n" is the number of servers, and "u^n" denotes u to the nth power.

Should back solving for "u" from "q" be necessary, the following formula, not described in Klassen & Silverman is used: u=q/(1+q) ^1/n.

Thus, in accordance with the present invention, there are provided:

1. a method for determining average network message length, average network utilization, and worst surviving frame network utilization level, which are extensions and improvements to Klassen & Silverman; and 2. a method and formula for deriving utilization from queue depth (number of messages on queue) in a multi server environment. Klassen & Silverman describes the corollary formula for multi server networks, $q=u^n/(1+u^n)$, and its importance.

In accordance, therefore, with the preferred embodiment of the invention, the system, actions performed by the user, and the methods executed by the code, are as follows.

A test station (or stations) 21 and the production stations 25 are attached to the voice and/or data communications network 20. The test station contains programming and network connectivity enabling it to transmit "pings" and "transactions" (defined below). In the preferred embodiment of the invention, the test station stores the results of pings and transactions it has transmitted and the responses it has received. The information stored includes time stamps of the sending and for the receiving of the pings and transactions, the number of transmissions for which there was no corresponding receipt ("lost packets"), and the priority level and the number of characters for each transmission and receipt. In the preferred embodiment, the test station also performs post-processing on the stored ping and transaction results that determine the capacity of the network, network response time, network utilization, transaction response time, and transaction processor utilization.

The production stations 25 are intelligent processing devices that are connected to the network. Typically, they run computer or microprocessor code to perform some useful function, and they also can echo test packets sent across the network, such as TCP/IP "pings," which serve a, "Hello, are you there?" query-response-type function. These stations can be any computers or other devices with microprocessors such as cell phones, personal assistants, pagers, household appliances or monitors, etc. that can communicate across voice and data communications network. Typically, these stations will perform some functions based on, time of day, or detection of some state of affairs (e.g., motion, door-ajar, or temperature/humidity sensor), or the processing of data or voice commands.

The range of devices in question is from sophisticated web-server computers to household appliances, and is intended to include the "pervasive computing" environment in which microprocessor intelligence is embedded in many devices that used to have no intelligence (e.g., vending machines). In many cases, intelligent devices will be connected to networks either as a part of their normal function, or at least for the purpose of remote monitoring as to whether they are functioning adequately. In those cases where network access is possible, it will be desirable to be able to determine the performance and utilization of the network connection and the performance and utilization of the microprocessor system that is attached to the network.

In many cases today, "end-to-end" connections involving intelligent devices across networks are extremely difficult to analyze with respect to performance and with respect to troubleshooting. This invention provides a means to determine whether there is a problem, and if so, whether the problem is in the network or in the end device.

In the following description of a preferred embodiment of the invention, "ping" refers to an echo packet sent from test station and echoed by the intelligent (target) station; "discrete ping" refers to a single ping, sent in isolation from other pings (e.g., the echo is returned, or is determined to have been lost, before another ping is sent); and "ping bursts" refers to transmissions of a fixed or variable number (two or more) ping packets in very rapid succession, with no wait (e.g., for receipt) between transmission of successive packets within a burst. Note that a test may include a sequence of bursts. In such cases there is no delay of ping transmissions within a burst. However, there may be delays between bursts, and these delays may be fixed intervals, or may be event driven, such as detection of receipt of a certain number of frames or expiration of a time value calculated prior to, during, or after commencement of the burst. "Transaction" refers to a unit of productive work that can be performed by the intelligent station.

By way of example, a sequence of events in usage under the preferred implementation of the invention may proceed as follows:

1. Performance of Test Routine
    at test station, user inputs name or network address of target station
    user customizes test station as to number, size, and wait time between transmissions of test samples
    user commences sending of network test samples and transaction test samples (network and transaction samples can be sent separately or interspersed)
    samples transmitted are (in whatever order desired):
        discrete long pings
        discrete short pings
        burst of long pings
        burst of short pings
        transaction samples (1): these transactions stress the processor of the intelligent system's processor)
        transaction samples (2): these transactions stress the storage retrieval function of the intelligent system
2. Analysis of Test Results
    All samples above have been time stamped for time of transmission from and receipt back from the test station, and the test station has also recorded the number of bytes sent and received for each ping and transmission sample. Also, the number of network sample frames dropped by the network (transmitted, but echo not received), has been recorded.
    Per Klassen & Silverman, the following values are calculated by post processing of the network sample results:
        the network's latency
        the network's response time bandwidth
        the network's throughput bandwidth
        the network's queue depth in bytes
        the network's utilization.
    Two methods for calculating utilization are new to this patent application and improve upon the utilization calculation for network in Klassan & Silverman. Method 1 is for case where there are no dropped packets, and method 2 is for case where the network has dropped packets.
    From network latency, capacity, and utilization network response time can be calculated for messages of any size. Therefore, best and average network response times are calculated for messages of the length of test transactions (1) and (2).
    Subtracting the best and average network times as calculated for messages of the length of transactions (1) and (2) from the best and average transaction times experienced for transactions (1) and (2) allows derivation of the average and best system (i.e., transaction time in the intelligent system, not including network time).
    Comparing best versus average time, the average number of transactions (1) and (2) in the intelligent system's queue are calculated.
    The utilization for transaction (1) is calculated by:

utilization=items on queue/(items on queue+1).

Thus estimated response time in the network and in the intelligent end system is determined for different types of applications.

Advantages over the Prior Art

It is an advantage of the invention that there is provided a system and method for monitoring performance, capacity, and utilization of a network system.

It is a further advantage of the invention that there is provided a system and method for predicting the future performance of a network system based on changes in utilization or capacity.

It is a further advantage of the invention that there is provided a system and method for recording the past performance, capacity and utilization of a networked system;

It is a further advantage of the invention that there is provided a system and method for enabling rapid, easy to use analysis of network connected processes providing those responsible for the management of the networked system supporting such processes to determine whether or not there is a problem in the networked system, and if there is a problem, whether it is in the end processors or the network, and whether the problem is with the capacity of or the tuning of an identified component.

It is a further advantage of the invention that there is provided a system and method for dealing with apparent responsiveness, a key concept for understanding the networked system's "response time" characteristics, providing an improved system and method for using transactions such as point and click together with pings of different sizes (as described in Klassen & Silverman) to mathematically deduce aspects of network performance, processor performance, and the network and processor performance considered as a unitary whole as its apparent responsiveness.

It is a further advantage of the invention that there is provided a system and method for performing mathematical analysis of test ping and transaction results to determine a network end-to-end throughput and response time bandwidth; the end processor transaction capacity; for determining a network end-to-end queue delay; for determining network end-to-end latency delay; for determining network internal 1 packet size; and for determining the utilization of a network and utilization of intelligent processors connected by the network.

It is a further advantage of the invention that there is provided a system and method for improving end-to-end bandwidth analysis; expanding the concept of a queue delay to one of a queue depth; and providing a system and method for improving analysis of processor utilization for the processor as a whole as well as for "e/O bound and processor bound operations.

It is a further advantage of the invention that there is provided a system and method for providing a comprehensive end-to-end queuing theory analysis of a network and processor.

It is a further advantage of the invention that there is provided a system and method for evaluating key network performance parameters of concern to the managers, support personnel, and planners responsible for data communication and data, voice, and video communications networks including the intelligent processors in supporting devices for such communications networks such as cellular phones and pagers.

It is a further advantage of the invention that there is provided a system and method for testing for the presence of prioritization support within a networked system and, if present, measuring the capacity, utilization, and performance of the networked system from the perspective of the various priority levels by means of transmission and analysis of sample packets and transactions set at varying priorities.

It is a further advantage of the invention that there is provided a flexible, portable, easy to use network analysis method and system which works non-disruptively on a live networked system, provides instantaneous analysis of the current condition of the networked system, to provide the capability to establish an historical database, and provides what if analysis for future changes to the networked system.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A system for monitoring performance, capacity, and utilization of a network system, comprising:
    means for sending probative test packets and transactions including short pings and long pings across a network to an intelligent end station to generate test results including best observed short ping and best observed long ping;
    means for deriving and applying network queue factor to said test results to determine capacity, utilization, and performance of said network, devices connected by said network, and said devices and said network considered as a unitary system;
    said test results further comprising data for instantaneously analyzing the current condition of said network system, establishing an historical database, determining how a user application transaction performs, and providing what if analysis for future changes to said network system.

2. A program storage device readable by a machine, tangibly embodying a program of instructions executable by a machine to perform method steps for monitoring performance, capacity, and utilization of a network system, said method steps comprising:
    sending probative test packets and transactions across a network to an intelligent end station;
    responsive to said test packets, calculating latency and average queue delay;
    calculating apparent and streaming bandwidths;
    calculating network hop count, multi-server factor, and queue depth; and therefrom determining capacity, utilization, and performance of said network, devices connected by said network, and said devices and said network considered as a unitary system.

3. The program storage device of claim 2, said method steps further comprising:

deriving and applying network queue factor to said test results to analyze the current condition of said network system;

establishing an historical database of said test results;

responsive to said test results, analyzing future changes to said network system.

4. The program storage device of claim 2, said sending step further comprising transmitting a plurality transactions of different types across the network to intelligent end systems; and said determining step further comprising the steps of:

calculating the portion of total response time contributed by said network;

calculating the portion of said total response time contributed by end processors;

calculating the utilization by processing subsystems of said end processor;

calculating the utilization by input/output systems of said processors;

calculating the utilization of said intelligent end system as a whole; and calculating the utilization of said network system, including said network and said intelligent end processors considered as a unitary entity.

5. System for monitoring performance, capacity, and utilization of a network system, comprising:

means for transmitting through said network system pings of different sizes to generate test data; and mean for determining apparent responsiveness of said network as a function of latency and average queue delay, apparent and streaming bandwidths, network hop count, multi-server factor, and queue depth responsive to said test data.

6. The system of claim 5, said apparent responsiveness including a measure of network performance, processor performance, and network and processor performance considered as a unitary whole.

7. Method for monitoring performance, capacity, and utilization of a network system, comprising the steps of:

transmitting through said network system pings of different sizes to generate test data; and responsive to said test data, calculating latency and average queue delay, apparent and streaming bandwidths, network hop count, multi-server factor, and queue depth for determining apparent responsiveness of said network system.

8. The method of claim 7, further comprising the steps of:

said transmitting step including performing long and short ping tests in isolation and in bursts to construct mathematical equivalents of isolation tests and burst tests.

9. Method of claim 7 for monitoring performance, capacity, and utilization of a network system, including the steps of:

generating network system test ping and transaction data;

performing mathematical analysis of said test ping and transaction data, including determining network end-to-end throughput and response time bandwidths, end processor transaction capacity, network end-to-end queue delay, network end-to-end latency delay, network internal packet size, network utilization, and utilization of intelligent processors connected by said network.

10. Method of claim 7 further for analyzing end-to-end bandwidth of said network system, comprising the steps of:

calculating queue depth; and responsive to said queue depth, determining processor utilization as a whole, and determining bound operations utilization.

11. Method of claim 7 for monitoring performance, capacity, and utilization of a network system, comprising:

testing for presence of prioritization support within said network system; and, if present, measuring the capacity, utilization, and performance of said network system with respect to a plurality of priority levels by transmitting and analyzing sample packets and transactions set at varying priorities.

12. Method of claim 7, further for determining utilization of a system including a network which is dropping test packets, comprising the steps of:

assigning an instantaneous network utilization value for a worst surviving ping instance determined proportionately from a ratio of dropped test samples to surviving test samples; and then determining average network message size and average utilization of said network.

13. A method for monitoring performance, capacity, and utilization of a network system, comprising the steps of:

transmitting through said network system pings of different sizes to generate test data;

said transmitting step including performing long and short ping tests in isolation and in bursts to construct mathematical equivalents of isolation tests and burst tests;

responsive to isolation tests, calculating latency and average queue delay;

calculating apparent and streaming band widths;

calculating network hop count, multi-server factor, and queue depth; and responsive to said test data, determining apparent responsiveness of said network system.

14. The method of claim 13, further comprising the steps of:

determining current utilization as the proportion of total bandwidth that is currently available and currently unavailable.

15. System for monitoring performance, capacity, and utilization of a network system including a test station, a network, and a target station, comprising:

means for performing test routines including test transactions across said network and probative tests of said network;

means responsive to data from said transactions and said tests for determining the state of the network, including as a function of network queue factor, network capacity and utilization;

means responsive to said state for deriving network contribution to application response time, and the capacity and utilization of said target station and its contribution to network system response time;

said means for performing test routines further including:

user input device at said test station for receiving from a user the name or network address of said target station and for customizing said test station as to number, size, and wait time between transmissions of test routines;

transmission means for sending said test transactions and probative tests to said target station, including discrete long pings, discrete short pings, burst of long pings, burst of short pings, first transaction samples that stress the processor of said target station, and second transaction samples that stress the storage retrieval function of said target station;

means for generating test results from said test transactions and probative tests including time of transmission from said test station and receipt back from said target station, number of bytes sent and received for each ping and transmission sample, and number of network sample frames dropped by the network; and means for analyzing said test results, including calculating network latency, network response time bandwidth, network throughput bandwidth, network queue depth, and network utilization.

16. A system for monitoring performance, capacity, and utilization of a network system including a test station, a network, and a target station, comprising:

means for performing test routines including test transactions across said network and probative tests of said network;

means responsive to data from said transactions and said tests for determining the state of the network, including network capacity and utilization;

means responsive to said state for deriving network contribution to application response time, and the capacity and utilization of said target station and its contribution to network system response time;

said means for performing test routines further including:
user input device at said test station for receiving from a user the name or network address of said target station and for customizing said test station as to number, size, and wait time between transmissions of test routines;

transmission means for sending said test transactions and probative tests to said target station, including discrete long pings, discrete short pings, burst of long pings, burst of short pings, first transaction samples that stress the processor of said target station, and second transaction samples that stress the storage retrieval function of said target station;

means for generating test results from said test transactions and probative tests including time of transmission from said test station and receipt back from said target station, number of bytes sent and received for each ping and transmission sample, and number of network sample frames dropped by the network; and means for analyzing said test results, including calculating network latency, network response time bandwidth, network throughput bandwidth, network queue depth, and network utilization;

means responsive to said network latency, network capacity, and said network utilization for calculating network response time for first and second test transactions of at least two message lengths;

means responsive to the response times for best and average network times calculated for said first and second test transactions for deriving average and best target system transaction time exclusive of network time;

means responsive to said best and average target system transaction time, for determining the average number of transactions in the queue of said target system; and means for calculating transaction utilization as said number of transactions in said queue divided by one plus said number of transactions in said queue.

17. A method for monitoring performance, capacity, and utilization of a network system including a test station, a network, and a target station, comprising the steps of:

performing test routines including test transactions across said network and probative tests of said network;

responsive to data from said transactions and said tests, determining the state of the network, including network capacity and utilization as a function of network queue factor;

responsive to said state, deriving network contribution to application response time, and the capacity and utilization of said target station and its contribution to network system response time;

said step for performing test routines further including:
receiving from a user the name or network address of said target station and customizing said test station as to number, size, and wait time between transmissions of test routines;

sending said test transactions and probative tests to said target station, including discrete long pings, discrete short pings, burst of long pings, burst of short pings, first transaction samples that stress the processor of said target station, and second transaction samples that stress the storage retrieval function of said target station;

generating test results from said test transactions and probative tests including time of transmission from said test station and receipt back from said target station, the number of bytes sent and received for each ping and transmission sample, and the number of network sample frames dropped by the network; and analyzing said test results, including calculating network latency, network response time bandwidth, network throughput bandwidth, the network queue depth, and network utilization.

18. A method for monitoring performance, capacity, and utilization of a network system including a test station, a network, and a target station, comprising the steps of:

performing test routines including test transactions across said network and probative tests of said network;

responsive to data from said transactions and said tests, determining the state of the network, including network capacity and utilization;

responsive to said state, deriving network contribution to application response time, and the capacity and utilization of said target station and its contribution to network system response time;

said step for performing test routines further including:

receiving from a user the name or network address of said target station and customizing said test station as to number, size, and wait time between transmissions of test routines;

sending said test transactions and probative tests to said target station, including discrete long pings, discrete short pings, burst of long pings, burst of short pings, first transaction samples that stress the processor of said target station, and second transaction samples that stress the storage retrieval function of said target station;

generating test results from said test transactions and probative tests including time of transmission from said test station and receipt back from said target station, the number of bytes sent and received for each ping and transmission sample, and the number of network sample frames dropped by the network;

analyzing said test results, including calculating network latency, network response time bandwidth, network throughput bandwidth, the network queue depth, and network utilization;

responsive to said network latency, network capacity, and said network utilization, calculating network response time for first and second test transactions of at least two message lengths;

responsive to the response times for best and average network times calculated for said first and second test transactions, deriving average and best target system transaction time exclusive of network time;

responsive to said best and average target system transaction time, determining the average number of transactions in the queue of said target system; and calculating transaction utilization as said number of transactions in said queue divided by one plus said number of transactions in said queue.

19. A method for monitoring performance, capacity, and utilization of a network system including a test station, a network, and a target station, comprising the steps of:

performing test routines including test transactions across said network and probative tests of said network;

responsive to data from said transactions and said tests, determining the state of the network, including network capacity and utilization as a function of network queue factor;

responsive to said state, deriving network contribution to application response time, and the capacity and utilization of said target station and its contribution to network system response time; and calculating average network message size and network utilization by:
  calculating unadjusted standard deviation value Tq for a set of short ping tests and long ping tests; and
  adjusting sigma Tq and queue depth to account for variance in service times as well as the multihop and multi server nature of the network.

20. A method for monitoring performance, capacity, and utilization of a network system including a test station, a network, and a target station, comprising the steps of:

performing test routines including test transactions across said network and probative tests of said network;

responsive to data from said transactions and said tests, determining the state of the network, including network capacity and utilization;

responsive to said state, deriving network contribution to application response time, and the capacity and utilization of said target station and its contribution to network system response time;

calculating average network message size and network utilization by:
  calculating unadjusted standard deviation value Tq for a set of short ping tests and long ping tests; and
  adjusting sigma Tq and queue depth to account for variance in service times as well as the multihop and multi server nature of the network;

calculating sigma Tq by adjusting said unadjusted Tq for the number of servers discovered in network testing;

further adjusting sigma Tq for network message size variance;

responsive to tests including isolated pings, determining network average one way queue delay;

responsive to tests including bursts of pings, determining the streaming bandwidth of said network;

responsive to said queue delay and said streaming bandwidth, deriving the network queue depth value; and adjusting said network queue value for multiple hops so that the value for adjusted sigma Tq closely approaches the value for Tq.

21. Method for determining utilization of a network system, comprising the steps of:

transmitting and receiving back a plurality of short ping packets in isolation from each other with respect to a target system across a network;

transmitting and receiving back a plurality of long ping packets with respect said target system across said network;

recording transmission and receipt time stamps for said packets, and calculating the round trip time for each said packet;

determining the average round trip times and the best and the worst times for said short ping packets and for said long ping packets;

calculating apparent network bandwidth;

determining network streaming bandwidth;

determining network duplex factor, hop count, and multi-server factor; and determining number of dropped short ping and long ping test packets.

22. Method for monitoring performance of a multi-server network system, including the steps of:

determining the average number of bits in network queues;

determining average network message size;

responsive to said average number of bits and said message size, calculating network utilization; and measuring queue buildup as $u^n/(1-u^n)$, where u is utilization and n is the number of servers in said multi-server network.

23. The method of claim 22, said step for measuring queue buildup further comprises the steps of performing discrete echo test, throughput test, hop count measurement, throughput factor determination, duplex factor determination, and multi-server factor determination.

24. A method for monitoring performance, capacity, and utilization of a network system, comprising the steps of:

transmitting through said network system pings of different sizes to generate test data;

responsive to said test data, determining apparent responsiveness of said network system;

transmitting test packets among devices in or attached to said network to generate test results, including a plurality of tests selected from the set of tests including:

sending echo or discard packets (e.g., pings) of uniform length, isolated from one another by fixed intervals;

sending echo or discard packets of uniform length in a stream;

sending echo or discard packets of different lengths, isolated from one another by fixed intervals;

sending a file or equivalent batch transfer unidirectionally across the network, repeating with different packet sizes;

sending a file bidirectionally across the network, repeating with different packet sizes;

sending multiple files unidirectionally across the network; and/or sending multiple files bidirectionally across the network;

sending processor-bound transactions across the network to end systems;

sending I/O-bound transactions across the network to end systems; and sending general transactions across the network to end systems.

25. The method of claim 24, further including the step of specifying a different transmission priority for each of at least two of said test packets.

26. The method of claim 25, further comprising the steps of:

first detecting whether prioritization has effect in the network;

determining the utilization of the network at different priority levels; and then deriving predictive results for current and future response time and window sizes for different types of service.

27. The method of claim 24, further comprising the steps of:

for each of a plurality of test transmissions, specifying a transmission priority that varies between different types of tests or between multiple iterations of one particular type of test;

applying network queue factor to the results of the said tests to mathematically evaluate the network under test with respect to capacity network response in transaction-type traffic, in screen image traffic, in batch traffic, in video, voice and other real-time traffic.

* * * * *